US010462609B1

(12) United States Patent
Carroll

(10) Patent No.: US 10,462,609 B1
(45) Date of Patent: Oct. 29, 2019

(54) SYSTEMS AND METHODS FOR TRACKING A PERSON

(71) Applicant: Christopher Paul Carroll, Framingham, MA (US)

(72) Inventor: Christopher Paul Carroll, Framingham, MA (US)

( * ) Notice: Subject to any disclaimer, the term of this patent is extended or adjusted under 35 U.S.C. 154(b) by 0 days.

(21) Appl. No.: 16/179,093

(22) Filed: Nov. 2, 2018

Related U.S. Application Data

(60) Provisional application No. 62/581,976, filed on Nov. 6, 2017.

(51) Int. Cl.
*H04W 4/029* (2018.01)
*G06F 16/955* (2019.01)

(52) U.S. Cl.
CPC .......... *H04W 4/029* (2018.02); *G06F 16/955* (2019.01)

(58) Field of Classification Search
CPC ........ H04L 67/306; H04L 67/22; H04W 4/02; H04W 4/08; G06Q 50/01; G06Q 50/265
See application file for complete search history.

(56) References Cited

U.S. PATENT DOCUMENTS 6,300,903 B1 10/2001 Richards et al.
6,317,718 B1 11/2001 Fano
6,434,159 B1 8/2002 Woodward et al.
7,200,566 B1 3/2007 Moore et al.
8,837,724 B2 9/2014 Rose et al.
8,886,125 B2 11/2014 Agrawal et al.
9,204,251 B1 * 12/2015 Mendelson .............. G08G 1/14
9,277,397 B2 * 3/2016 Kolanowski .......... H04L 67/306
9,483,769 B2 11/2016 Rajan et al.
10,117,049 B2 * 10/2018 Gaver .................. H04W 24/00
2002/0165758 A1 * 11/2002 Hind .................... G06Q 10/087 705/7.29
2008/0280624 A1 11/2008 Wrappe
2012/0124637 A1 * 5/2012 Dunaway ................ G06F 21/00 726/1
2013/0040619 A1 * 2/2013 Grube ..................... H04W 8/22 455/414.1
2015/0003320 A1 * 1/2015 Anderson ............ H04W 12/06 370/328

(Continued)

*Primary Examiner* — Dung Hong

(57) ABSTRACT

The application describes systems and methods for associating a person with one or more wireless devices. The system includes a first wireless reader arranged to detect a first set of wireless device identities at a first time period and at a first location. The system also includes a second wireless reader arranged to detect second set of wireless device identities at a second time period and at a second location. The system further includes a server, in electronic communication with the first and second wireless readers via a network, arranged to: receive the first set of detected wireless device identities from the first wireless reader and the second set of detected wireless device identities from the second wireless reader; compare the first set of wireless device identities with the second set of wireless device identities; identify a first matching set of wireless device identities including matching wireless device identities between the first set of wireless device identities and the second set of wireless device identities; and associate a first user identity with the first matching set of wireless device identities.

20 Claims, 16 Drawing Sheets

(56) References Cited

U.S. PATENT DOCUMENTS

| | | | | |
|---|---|---|---|---|
| 2015/0199890 | A1* | 7/2015 | Hewett | G08B 13/2451 340/572.1 |
| 2016/0063539 | A1* | 3/2016 | Alla | G06Q 30/0246 705/14.45 |
| 2017/0134232 | A1* | 5/2017 | Palanciuc | H04L 41/0893 |
| 2017/0331828 | A1* | 11/2017 | Caldera | G06F 21/316 |
| 2018/0300645 | A1* | 10/2018 | Segal | G06N 7/023 |

* cited by examiner

700

$L_1$, $T_1$

| Credit cards | Wireless device IDs |
|---|---|
| $CC_A$ | WD $ID_A$ |
| $CC_B$ | WD $ID_B$ |
| | WD $ID_C$ |
| | WD $ID_D$ |
| | WD $ID_F$ |
| | |

| Credit cards | Wireless device IDs |
|---|---|
| $CC_A$ | WD $ID_A$ |
| $CC_c$ | WD $ID_B$ |
| | WD $ID_C$ |
| | WD $ID_F$ |
| | WD $ID_G$ |

Association table

| Credit cards | Wireless device IDs |
|---|---|
| $CC_A$ | WD $ID_A$ |
| | WD $ID_B$ |
| | WD $ID_C$ |

| Wireless device IDs |
| --- |
| WD $ID_A$ |
| WD $ID_B$ |
| WD $ID_C$ |
| WD $ID_D$ |
| WD $ID_G$ |
| |

$L_2$ and/or $T_2$

| Wireless device IDs |
| --- |
| WD $ID_A$ |
| WD $ID_B$ |
| WD $ID_C$ |
| WD $ID_F$ |
| WD $ID_G$ |
| |

Association table

| Wireless device IDs | Consumer |
| --- | --- |
| WD $ID_A$ | Consumer A |
| WD $ID_B$ | |
| WD $ID_C$ | |
| | |

FIG. 7F

SYSTEMS AND METHODS FOR TRACKING A PERSON

REFERENCE TO RELATED APPLICATIONS

This application claims priority to and the benefit of U.S. Provisional Patent Application No. 62/581,976, filed on Nov. 6, 2017, and entitled "Systems and Methods for Tracking a Person," the entire contents of which are incorporated herein by reference.

FIELD OF THE DISCLOSURE

The disclosure relates generally to systems and methods for tracking a person. More particularly, in various aspects, the disclosure relates to tracking one or more wireless or other devices associated with a person.

INTRODUCTION

Consumers are increasingly carrying more and more wireless devices (WDs) on their person at the same time. A person may carry one or more wireless communications devices. For example, a person may carry one or more mobile phones, laptops, and data computing devices (i.e., an iPad). A person may have a wireless watch and/or wireless capable computing glasses. These wireless devices may have one or more wireless communications interfaces supporting one or more wireless protocols such as long term evolution (LTE), GSM, Bluetooth, Wifi, WiMax, and RFID protocols, and so on. More and more consumer items may be imbedded with wireless devices including identifiers such as radio frequency identifiers (RFIDs). These wireless devices typically communicate with data networks, such as the Internet and/or private networks, using, for example, wireless access points (APs), wireless readers, or base stations (BS).

While wireless devices are configured to identify themselves when accessing their respective wireless data networks, there is limited coordination of information among the various networks regarding wireless devices in the possession of a person and, therefore, relatively limited and unsophisticated ways of tracking a person and/or consumer.

SUMMARY

The application, in various embodiments, addresses the deficiencies associated with tracking a person using one or more wireless devices.

In one aspect, the present disclosure includes a system for associating a person with one or more wireless devices (WDs). The system includes a first wireless reader arranged to detect a first set of wireless device identifiers at a first time and at a first location (i.e, during a first detection event). The system also includes a second wireless reader arranged to detect a second set of wireless device identifiers at a second time and at a second location (i.e., during a second detection event). The system further includes a server in electronic communication with the first and second wireless readers via a network. The server may be configured to receive the first set of detected wireless device identifiers from the first wireless reader and the second set of detected wireless device identifiers from the second wireless reader. The server then compares the first set of wireless device identifiers with the second set of wireless device identifiers and identifies a first matching set of wireless device identifiers including matching wireless device identifiers between the first set of wireless device identifiers and the second set of wireless device identifiers. The server then associates a first user identity (i.e., a first user) with the first matching set of wireless device identifiers.

The system may include a plurality of wireless readers dispersed over a plurality of known locations. The server may be further arranged to track the location of the first user based on detecting at least one wireless device identifier of the first matching set of wireless device identifiers at one of the known locations. The server may store a list of known locations of wireless readers that interface with the server. The server may receive location information from a wireless reader along with detection event information or separately. Tracking the location of the first user may include a process of comparing each of the received plurality of wireless device identifiers detected at a known location with at least one wireless device identifier of the first matching set of wireless device identifiers and determining a location of the first user based on identifying a match between one of the received plurality of wireless device identifiers and at least one wireless device identifier of the first matching set of wireless device identifiers.

A location may include an area of wireless coverage of a wireless reader. A wireless reader may includes at least one of an RFID reader, a base station, an access point, a base station emulator, and an access point emulator, a wireless network emulator, a data network emulator, a data service emulator, a website emulator, a wireless network scanner, and an access point scanner. In some configurations, the first wireless reader and the second wireless reader are the same and the first location and the second location are the same.

Detecting identifiers at the first and/or second times may be performed for a time period of less than or equal to one of 1 second, 10 seconds, 30 seconds, 1 minute, 10 minutes, 30 minutes, 1 hour, 8 hours, 1 day, 1 month, and 1 year. The second time may occur after the first time. The first wireless reader may includes a wireless interface implementing a first wireless protocol and the second wireless reader may include a wireless interface implementing a second wireless protocol different from the first wireless protocol. The first and second wireless protocols may include a mobile telephone standard, an 802.11 standard, a Wifi-based standard, a Bluetooth standard, and/or an RFID standard.

The system may include a third wireless reader arranged to detect a third set of wireless device identifiers at a third time and at a third location. The server may compare the third set of wireless device identifiers with the first matching set of wireless device identifiers. The server may identify a second matching set of wireless device identifiers including matching wireless device identifiers between the third set of wireless device identifiers and the first matching set of wireless device identifiers. The server may then associate the first user identity with the second matching set of wireless device identifiers. The third time may occur after the first and second time periods. The server may be further arranged to track the location of the first user based on detecting at least one wireless device identifier of the second matching set of wireless device identifiers at a known location.

The one or more wireless devices may include at least one of a handheld computer, a personal digital assistant, a cellular or mobile telephone, a network appliance, a camera, a smart phone, a media player, a navigation device, an email device, a game console, or a combination of any two or more of these data processing devices, or a data processing device including a wireless communications interface. The server may be arranged to determine a type of wireless device identifier of one or more of the wireless identifiers of the first and second set of wireless device identifiers. Determining the type of wireless device identifier may be based on one or more of a size of a wireless device identifier, a format of a wireless device identifier, a message containing a wireless device identifier, a wireless protocol containing a wireless device identifier, a data protocol containing a wireless device identifier, and the type of message containing a wireless device identifier. The server may assign a weight to a wireless device identifier based on the type of wireless device identifier (e.g., permanent, long term, temporary, subscriber based, device based, removable, modifiable, etc. . . . ) and/or the type of wireless device associated with the wireless device identifier (e.g., mobile handset, RFID, PDA, earphones, etc. . . . ). The server may assign a lower weight to a temporary identifier than to a long term identifier. A long term identifier may include an identifier permanently assigned to a device and/or subscriber, an identifier assigned to a device and/or subscriber by their home service provider, employer, government entity, and the like, or an identifier assigned to a device and/or user for a period of time longer than a period time in which the device and/or subscriber is expected to access a resource for a particular objective (e.g., cellphone roaming in visited mobile network, device and/or user access to data network while visiting a remote location, and the like).

In another aspect, a server for associating a person with one or more wireless devices includes a communications interface configured to: receive, from a first wireless reader, a first set of wireless device identifiers detected during a first time at a first location; receive, from a second wireless reader, a second set of wireless device identifiers detected during a second time at a second location. The server may also include a processor configured to: compare the first set of wireless device identifiers with the second set of wireless device identifiers; identify a first matching set of wireless device identifiers including matching wireless device identifiers between the first set of wireless device identifiers and the second set of wireless device identifiers; and associate a first user identity (i.e., a first user) with the first matching set of wireless device identifiers.

The server may include a memory for storing location information associated with each of a plurality of wireless readers dispersed over a plurality of locations. The communications interface may be configured to receive a plurality of wireless device identifiers from the plurality of wireless readers. The processor may be further configured to: compare each of the received plurality of wireless device identifiers with at least one wireless device identifier of the first matching set of wireless device identifiers, and determine a location of the first user based on identifying a match between one of the received plurality of wireless device identifiers and the at least one wireless device identifier of the first matching set of wireless device identifiers.

The location information associated with each of the plurality of wireless readers may be received concurrently with detected wireless device identifiers received from each of the plurality of wireless readers or received separately. The location information associated with the plurality of wireless readers may be manually, automatically (e.g., via a wireless reader location update message), periodically, and/or in response to a query from the server loaded into the memory of the server.

In another aspect, a non-transient computer readable medium containing program instructions for causing a computer to perform the method of: receiving, from a first wireless reader, a first set of wireless device identifiers detected at a first time at a first location; receiving, from a second wireless reader, a second set of wireless device identifiers detected at a second time at a second location; comparing the first set of wireless device identifiers with the second set of wireless device identifiers; identifying a first matching set of wireless device identifiers by matching wireless device identifiers between the first set of wireless device identifiers and the second set of wireless device identifiers; and associating a first user identity with the first matching set of wireless device identifiers.

DRAWINGS

The foregoing and other objects and advantages of the disclosure will be appreciated more fully from the following further description thereof, with reference to the accompanying drawings. The skilled person in the art will understand that the drawings, described below, are for illustration purposes only. The drawings are not intended to limit the scope of the applicant's teaching in any way.

FIG. 1 includes a diagram of a system having various wireless readers connected to a data network and being arranged to detect wireless devices associated with multiple persons;

FIG. 2 includes a functional block diagram of a computer;

FIG. 3A includes a diagram of a system arranged to detect wireless devices and/or credit cards associated with users at a particular time and location; and FIG. 3B includes a diagram of a system arranged to detect wireless devices and/or credit cards associated with users at different time in the same location or at a different time in a different location;

FIG. 4A includes a diagram of a wireless device including a unique identifier;

FIG. 4B includes a diagram of a credit card including a unique identifier;

FIG. 5A includes a block diagram of a wireless reader including multiple wireless protocol interfaces;

FIG. 5B includes a diagram illustrating wireless reader detecting one or more wireless identifiers via one or more OSI layers from a wireless device;

FIG. 6 includes a block diagram of a process for association and detection of wireless devices;

FIG. 7A shows a detection table 700 including credit card numbers and wireless device identifiers detected at a first time t1 and first location L1.

FIG. 7B shows a detection table including credit cards and wireless device identifiers detected at a different time t2 in the same location L1 or at a different time t2 in a different location L2 than the first time t1 and first location L1.

FIG. 7C shows an association table associating credit card A with wireless device identifiers;

FIG. 7D shows a detection table including wireless device identifiers detected at a first time t1 and first location L1.

FIG. 7E shows a detection table including wireless device identifiers detected at a different time t2 in the same location L1 or at a different time t2 in a different location L2 than the first time t1 and first location L1.

FIG. 7F shows an association table associating first person (i.e., user or consumer) with wireless device identifiers;

DESCRIPTION

While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The application describes systems and methods for tracking a person based on detecting and/or tracking one or more wireless devices and/or other devices (e.g., a credit card) associated with the person.

Figure 1:
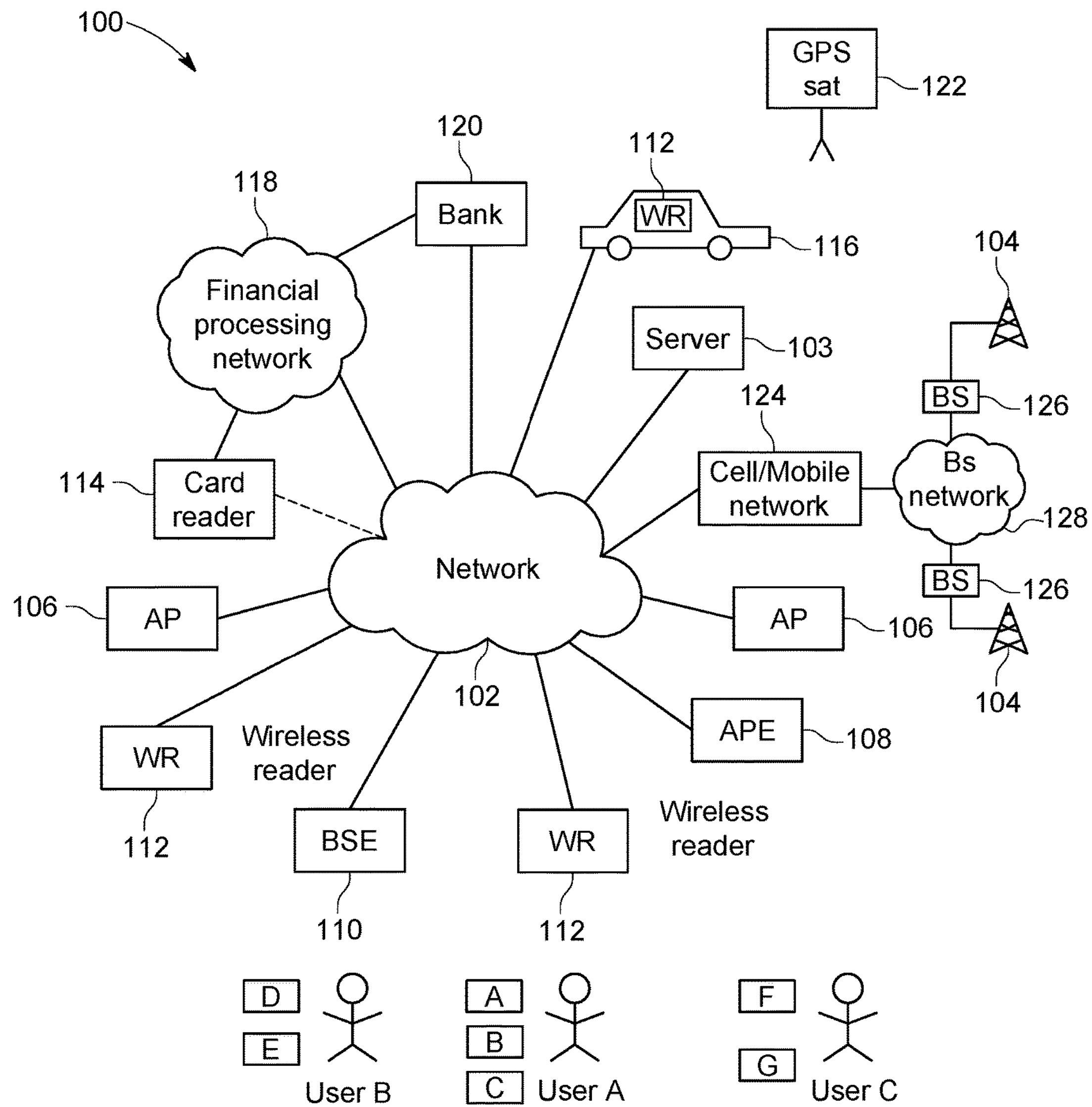

FIG. 1 includes a diagram of an information system 100 having various wireless readers connected to a data network 102 and being arranged to detect wireless devices WDa, WDb, WDc, WDd, WDe, WDf, WDg (WDa-WDg) associated with multiple persons such as user A, user B, and user C. These wireless devices may have one or more wireless communications interfaces supporting one or more wireless protocols such as long term evolution (LTE), GSM, Bluetooth, Wifi, WiMax, and RFID protocols, and so on. A wireless device may include any type of mobile device such as a mobile telephone or other type of portable computing device having a wireless communications interface. A wireless reader includes any device capable of capturing a wireless device identity such as, for example, a RFID receiver RFID transceiver, Wifi Access Point (AP), a mobile Base Station (BS), a wireless access and/or control channel scanner, Wifi scanner, RFID scanner, Bluetooth scanner, Bluetooth transceiver, BS Emulator (sometime referred to as a "False Base Station") (BSE), an AP Emulator (APE), Bluetooth device emulator (BDE), a mobile device or other wireless device configured as one or more of the previously listed wireless readers, a vehicle transponder reader, badge reader, and the like. A BSE, APE, or BDE may be generally referred to as a wireless network emulator (WNE). A wireless network emulator includes a device configured to mimic a wireless network during an access request process for a wireless device to access a wireless network. During the access request process, a wireless device, such as a mobile telephone, provides identity information associated with the device and/or identity information associated with the wireless device user (e.g., subscriber identity information) to the wireless network. The WNE impersonates a wireless network to obtain identifier information from a wireless device but then may or may not provide any other network services. A wireless reader may include a data network emulator, a data service emulator, a data application emulator, and/or website emulator (generally referred to as "data provider emulators"—DPEs). A DPE may include a device and/or application configured to mimic a data network, data service, data application and/or website during an access request process to such a data network, data service, and/or website. For example, an application allowing access to a data service (e.g., Amazon.com, CBS News, Netflix) running on an iPhone may communicate a UDID and other personally identifying information (i.e., user name) to a data service. Hence, a DPE may mimic a service at least long enough to obtain one or more identifiers. A wireless scanner can monitor known communications channels associated with wireless network and intercept and/or read registration information provided by a wireless device to the wireless network over those communications channels. A data network scanner or network sniffer can monitor known one or more protocol layers, messages, and/or data packets associated with data network (Internet, Ethernet, wireless) and intercept and/or read registration information provided by a device to a service, router, or website. The registration information typically includes identifying information such as a wireless device identifier (WD ID). A wireless reader may monitor forward channels (from the network to a wireless device) and/or reverse channels (from the wireless device to the network) to capture wireless device identifiers.

In some implementations, system 100 includes is a mobile device, e.g., WDa, cellular tower transceivers 104, access point transceivers 106 (e.g., WiFi beacons), APE 108, BSE 110, wireless readers (WR) 112 (including a WR 112 within vehicle 116), card reader 114, financial processing network 118, and bank 120. Any one or more of WDa-WDg may be any device capable of determining its current geographic location by communicating with a positioning system, such as GPS including GPS satellite 122, cellular networks such as network 124, WiFi networks, and any other technology that can be used to provide the actual or estimated location of a wireless device WDa-WDg. A wireless reader 112 and any other devices may be connected with network 102 via a wired and/or wireless interface. Some examples of wireless devices include, but are not limited to: a handheld computer, a personal digital assistant, a cellular telephone, a network appliance, a camera, a smart phone, a long term evolution (LTE) mobile phone, a network base station, a media player, a navigation device, an email device, a game console, or a combination of any two or more of these data processing devices or other data processing devices. WDa-WDg can each include a storage device (e.g., flash memory, hard disk) for storing a database (DB). A wireless device may also function as a wireless reader.

Cellular tower transmitters 104 can be coupled to data network 102 (e.g., the Internet) via base stations 126 and a base station network 128, and access point transmitters and/or transceivers 106 can be coupled to network 102 through wired and/or wireless communication links and may interact directly or indirectly with a wireless device such as WDa.

In some implementations, wireless devices, such as WDa, may operate on a cellular network including cellular tower transceivers 104. The cellular network may comprise a first cellular network cluster and second cellular network cluster. Each cellular network cluster may contain a controller and a plurality of base stations 126. Each base station 126 may cover a single cell of the cellular network cluster, and each base station 126 may communicate through a wireless connection with the controller of network 124 for call processing, as is well known in the art. Wireless devices may communicate via the nearest base station (i.e. the cell the device currently resides in). Roaming functionality is provided when a wireless device roams from one cell to another so that a session is properly maintained with proper signal strength. A controller in network 124 acts like a telephony switch when a wireless device roams across cells, and it communicates with the controller via a wireless connection so that a wireless device, such as WDa, can also roam to other clusters over a larger geographical area. A first controller may be connected to a second controller in a cellular cluster through a physical connection, for example, copper wire, optical fiber, or the like. This enables cellular clusters to be great distances from each other. The controller may in fact be connected with a physical connection to its base stations 126. Base stations 126 may communicate directly with a controller of network 124. Base stations 126 may communicate indirectly to the controller, for example through other base stations. It is well known in the art that many options exist for enabling interoperating communications between controllers and base stations 126 for the purpose of managing a cellular network. A cellular network cluster may be located in a different country.

A base controller may communicate with a controller through a Public Service Telephone Network (PSTN) by way of a first telephony switch, a PSTN, and second telephony switch, respectively. The first and second telephony switches may be private or public. A server-side data processing system may execute cellular network management functions at the controllers of network 124. A receiving data processing system may execute functions at a wireless device, for example a mobile laptop computer, wireless telephone, a personal digital assistant (PDA), or the like. As the wireless device WDa moves about, positional attributes may be monitored for determining a situational location. The wireless device WDa may be handheld, or installed in a moving vehicle such as vehicle 116. Locating a wireless device using wireless techniques such as Time Difference of Arrival (TDOA) and Angle Of Arrival (AOA) are well known in the art. The server-side data processing system, which may be located at server 103 and/or in a server of network 124, may also execute on a server computer accessible to controllers, provided an appropriate timely connection exists between cellular network controller(s) and the server computer such as server 102.

A wireless device may be known by a unique wireless device identifier (WD ID), for example a caller id, device identifier, subscriber identifier, or like appropriate unique handle. A wireless device, such as a mobile device, may include a subscriber identity module (SIM) chip or card. The mobile device and/or SIM may include a unique subscriber identifier such as an International mobile subscriber identity (IMSI), a mobile identification number (MIN), a mobile subscription identification number (MSID or MSIN), temporary mobile subscriber identity (TMSI), Mobile Subscriber ISDN Number (MSISDN), Mobile Station International ISDN Number, Mobile International ISDN Number, Subscriber Number (SN), and/or a Packet temporary mobile subscriber identity (P-TMSI). A mobile device may include one or more unique identifiers such as, without limitation, a unique electronic serial number (ESN), a mobile device identifier, a mobile equipment identifier (MEID), an International Mobile Equipment Identifier (IMEI), a media access control (MAC) address, Android ID, a Unique Device Identifier (UDID), Universally Unique Identifier (UUID), a Core Foundation Universally Unique Identifier (CFUUID), a globally unique identifier (GUID), an OpenUDID, a SecureUDID, an unique Identifier (UIDevice), LTE static IP address (UEIP), Tracking Area Identity (TAI), Temporary Identity Number (TIN), Globally Unique Temporary UE Identity (GUTI), advertising ID—identifierForAdvertising (IDFA), identifierForVendor (IDFV), an Android Advertising ID, Google Advertising ID, Windows Advertising ID, Apple ID (i.e., iOS App IDs), Packet Data Network Identity (PDN ID), P-GW ID, Evolved Packet System Bearer Identifier (EPS Bearer ID), E-UTRAN Radio Access Bearer Identifier (E-RAB ID), Data Radio Bearer Identifier (DRB ID), Public Land Mobile Network Identifier (PLMN ID), MME Identifier (MMEI), Globally Unique MME Identity (GUMMEI), Tracking Area Identity (TAI), Temporary Identity (TIN), SAE Temporary Mobile Subscriber Identity (S-TMSI), MME temporary mobile subscriber identity (M-TMSI), and a tunnel end point identifier (TEID), C-RNTI, User Equipment Identifier (UEID), an email address, an IP address, a Mobile IP address, a username, and other device identifiers.

The mobile network 124 may provide and a wireless device may be configured to operate in one or more of the following mobile networks: 5G (Fifth Generation) mobile service, 4G (Fourth Generation) mobile service, 3G (Third Generation) mobile service, an IMT-Advanced Standard (International Mobile Telecommunications-Advanced) service, an LTE (Long Term Evolution) mobile service, a CDMA (Code Division Multiple Access) mobile service, GSM (Global System for Mobile communications), GPRS (General Packet Radio Service) and EGPRS (Enhanced General Packet Radio Service). A wireless device may include one or more RFID tags. The tags may include electronically stored information. The tags may be active, passive, or battery assisted passive. Tags may be unique. Tags may be read-only or may be read/write enabled. An RFID tag may enable automatic identification and data capture (AIDC). An RFID may be integrated with circuitry of a wireless device and/or embedded on an RFID microchip. A wireless device may be attached to or integrated with an item such as, for example, cash, badge, credit card, loyalty card, passport, document, book, clothing, possessions, the body of a human or animal, a vehicle, bottle, drug container and/or bottle, baggage, medical equipment, instruments, and so on. An RFID may implement standards as described in, for example, ISO/IEC 18000, ISO/IEC 29167, ISO/IEC 20248, and ISO/IEC JTC 1/SC 31 Automatic identification and data capture techniques, EPC Gen2, the entire contents of which are incorporated herein by reference. An RFID reader may include a passive reader active tag (PRAT) system with an adjustable range of about 1-2000 feet (0-600 m); an active reader passive tag (ARPT), or an active reader active tag (ARAT). An RFID may utilize a frequency band based on ISO/IEC 15693 and ISO/IEC 14443 A,B, EAN, 802.11 WLAN, Bluetooth, ISM bands including ISM worldwide, short range, unregulated, and/or Ultra wide band. An RFID may include an electronic product code (EPC) as a unique identifier. Other application layer identifiers may include a gaming identifier such as for Pokemon Go or geographically-based applications.

Locating functionality can be provided to wireless device or wireless reader through local automatic location detection means or by automatic location detection means remote to the wireless device WDa-WDg or wireless reader 112. Automatic location detection functionality determines the whereabouts of a device, and examples include GPS (Global Positioning System) chips, GPS accessories, Bluetooth connected GPS, triangulated location determination, cell-tower triangulated location, antenna triangulated location, in-range proximity based location detection, combinations thereof, or by any other automatic location detection means. This disclosure supports any device with GPS functionality regardless of how the GPS functionality is provided to, or for, the wireless device. Many wireless devices may be Bluetooth enabled which provides the ability to adapt GPS locating means to the device. This disclosure also supports proximity location means which involves a wireless device or wireless reader coming within range of a detecting means for determining a known location. Being within range of the detecting means implies locating the wireless device or wireless reader by associating it to the location of the detecting means (i.e., a wireless reader). There are various wireless detection methods and implementations well-known in the art for knowing when a wireless device comes into range of communications.

In various aspects, GPS satellites such as satellite 122, provide information, as is well known in the art, to GPS enabled devices on earth for triangulation locating of the GPS enabled device, such as a wireless device or wireless reader. In some implementations, a wireless device or wireless reader has integrated GPS functionality so that the wireless device and/or wireless reader monitors its positional attribute(s). When the wireless device such as WDa determines a candidate delivery event, it may communicate location parameters to a controller and/or server 103 (or server 1202) by way of the nearest base station 126. Wireless readers 112, BSE 110, APE 108, card reader 114, vehicle 116 may utilize any of the techniques described above to determine their location and, thereby send their location information to server 103 and/or 1202 as will be explained later herein.

Server 103 may include one or more server computers supporting location services. Server 103 may deliver location information to a wireless device and/or wireless reader. In some implementations, wireless device WDa collects and stores network information associated with transmitter detection events. The network information can include a transmitter identifier (ID) of a detected transmitter, a timestamp marking a time of the transmitter detection event and a location, if available. Some examples of transmitter IDs include but are not limited to Cell IDs provided by cell tower transmitters 104 in a cellular communications network (e.g., transmitters on GSM masts) and access point transceiver 106 IDs (e.g., a Media Access Control (MAC) address). A wireless access point (AP) (such as that represented by access point transceivers 106) can be a hardware device or a computer's software that acts as a communication hub for users of a wireless device to connect to a wired LAN. Other examples of cellular network information include Mobile Country Code (MCC), Mobile Network Code (MNC) and Location Area Code (LAC).

The transceiver or transmitter IDs can be correlated with known geographic locations of corresponding transmitters. The geographic locations of the transmitters can be used to compute estimated position coordinates (e.g., latitude, longitude, altitude) for wireless device and/or wireless reader over a period of time. For example, a sequence of transmitter IDs can be compared with a reference database (e.g., Cell ID database, WiFi reference database) that maps or correlates the transmitter IDs to position coordinates of corresponding transmitters, and computes estimated position coordinates for a wireless device and/or wireless reader based at least in part on the position coordinates of the corresponding transmitters. If a reference database is available on a wireless device and/or wireless reader, then the mapping can be performed by a processor of wireless device, wireless reader, and/or server 103. Alternatively, the transmitter IDs can be sent to server 103 and/or 1202 which can store transmitter position coordinates in a remote reference database such as, for example, database 1206 for FIG. 12. Server 103 and/or server 1202 may map or correlate transmitter IDs to position coordinates of corresponding transmitters which can be sent back to a wireless device and/or wireless reader through network 102 and one or more wireless communication links. The position coordinates can be reverse geocoded to map locations (e.g., street locations). The map locations can be represented by markers (e.g., pushpin icons) on a map view displayed by a wireless device or user interface of server 103 and/or 1202, or used for other purposes by mobile applications. The position coordinates and associated timestamps can be stored in database 1206 and/or a storage device associated with server 103 and/or 1202 for subsequent retrieval and processing by a system operator (at server 103 and/or 1202), user, and/or application. The position coordinates and timestamps can be used to construct a timeline in a map view showing a history of locations for a wireless device WDa-WDg.

Figure 2:
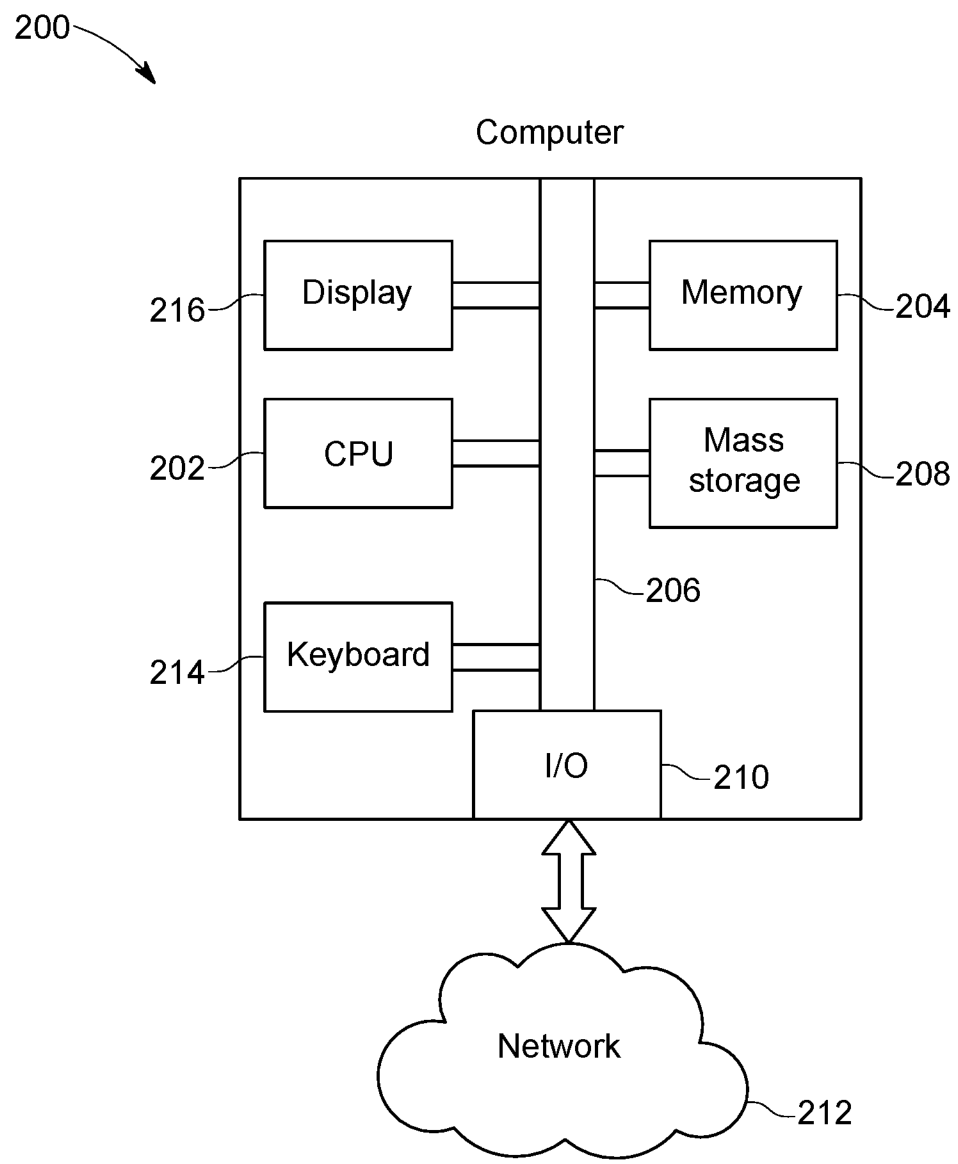

FIG. 2 includes a functional block diagram of a general purpose computer system, e.g., a computer, for performing the functions of a computer for a wireless device, server, wireless reader, and so on. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or memory sticks, for storing data and instructions for use by the CPU 202. At least one component of the mass storage system 208, preferably in the form of a disk drive or tape drive, stores the database used for processing data and/or wireless device detection and user association records of the system 100. The mass storage system 208 may also include one or more drives for various portable media, such as a floppy disk, flash drive, a compact disc read only memory (CD-ROM, DVD, CD-RW, and variants), or an integrated circuit non-volatile memory adapter (i.e. PC-MCIA adapter) to input and output data and code to and from the computer system 200.

The computer system 200 may also include one or more input/output interfaces for communications, shown by way of example, as interface 210 for data communications via the network 212 (or network 114). The data interface 210 may be a modem, an Ethernet card or any other suitable data communications device. To provide the functions of a computer 102 according to FIG. 1, the data interface 210 may provide a relatively high-speed link to a network 212 (or network 114 of FIG. 1), such as an intranet, internet, or the Internet, either directly or through another external interface 116. The communication link to the network 212 may be, for example, optical, wired, or wireless (e.g., via satellite or cellular network). Alternatively, the computer system 200 may include a mainframe or other type of host computer system capable of Web-based communications via the network 212. The computer system 200 may include software for operating a network application such as a web server and/or web client.

The computer system 200 also includes suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216.

Server operations personnel may interact with the system 200 for controlling and/or programming the system from remote terminal devices via the network 212.

The computer system 200 may run a variety of application programs and store associated data in a database of mass storage system 208. One or more such applications may include wireless device detection, association, and tracking as described with respect to FIGS. 3-12.

The components contained in the computer system 200 are those typically found in computer systems used as servers, workstations, personal computers, network terminals, and the like. In fact, these components are intended to represent a broad category of such computer components that are well known in the art.

As discussed above, the computer system 200 may include one or more applications that provide wireless device detection, association, and tracking in accordance with aspects of the disclosure herein. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. Additionally, general techniques for high level programming are known, and set forth in, for example, Stephen G. Kochan, Programming in C, Hayden Publishing (1983). The system 200 may use a DSP for which programming principles well known in the art.

As stated previously, the mass storage 208 may include a database. The database may be any suitable database system, including the commercially available Microsoft Access database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system 200 may include a database that is integrated with the system 200, however, it will be understood by those of ordinary skill in the art that in other embodiments the database and mass storage 208 can be an external element.

In certain embodiments, the system 200 may include an Internet browser program and/or be configured operate as a web server. In some embodiments, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the server and/or client application may be continuously developed and released.

In one implementation, the system 100 includes a networked-based, e.g., Internet-based, application that may be configured and run on the system 200 and/or any combination of the other components of the information system 100. The server 102 and/or computer system 200 may include a web server running a Web 2.0 application or the like. Web applications running on the server 102 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain embodiments, the server 102 and/or wireless devices WDa-WDg may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The server 103, server 1202, a wireless reader 112, and/or WDa-WDg, or another component of system 100 and/or 300 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, and any like public key or private key based schemes.

Figure 3A:
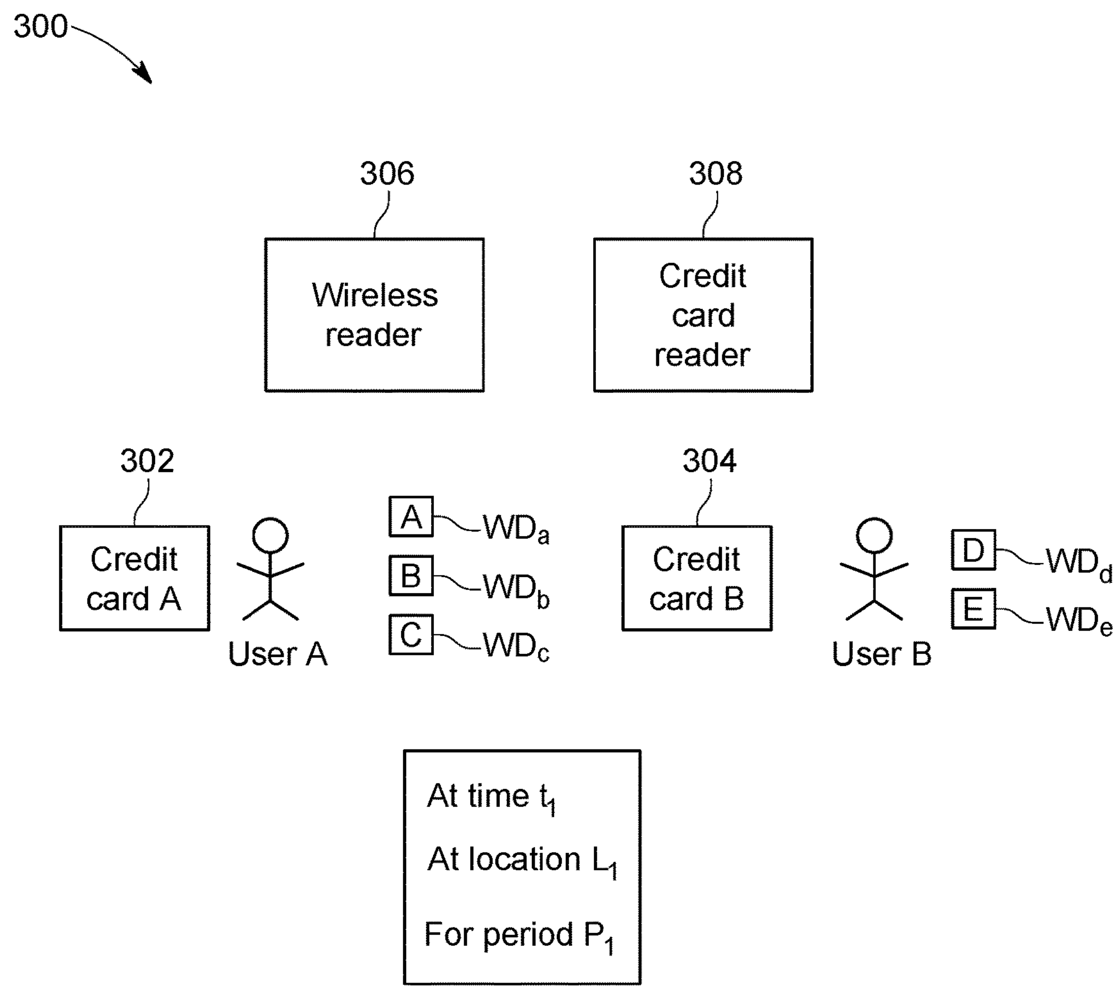
Figure 3B:
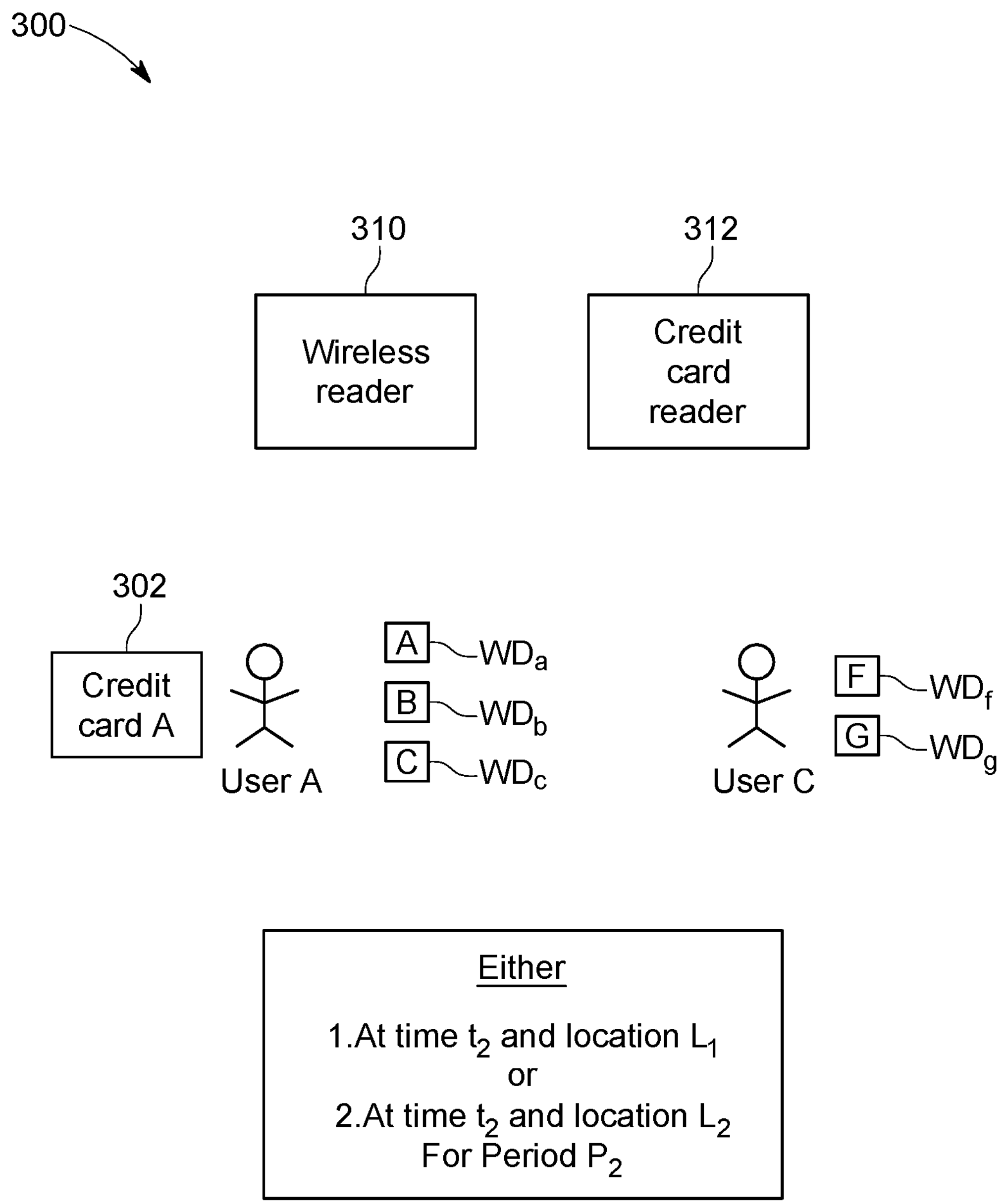

FIGS. 3A and 3B illustrate a system 300 arranged to detect wireless devices at different times in the same or different locations. FIG. 3A illustrates a first detection event when wireless device identifiers are detected and FIG. 3B illustrates a second detection event when wireless device identifiers are detected. Such an arrangement, enabling multiple detection events, advantageously enables efficient identification of wireless devices associated with a particular person.

FIG. 3A includes a diagram of a system 300 arranged to detect wireless devices WDa, WDb, WDc, WDd, and WDe and/or credit cards 302 and 304 associated with user A and user B at a particular time t1 and location L1. Wireless devices WDd and WDe may be in the possession of user B, while wireless devices WDa, WDb, and WDc may be in the possession of user A. The system 300 also includes wireless reader 306 and may include credit card reader 308, credit card 302 associated with user A, and credit card 304 associated with user B. At time t1 in location L1, wireless reader 306 detects, intercepts, and/or reads the wireless device identities of WDa-WDe. In this scenario, each WD ID corresponds to a wireless device WDa-WDe. However, there may be circumstances where a wireless device has multiple identifiers. For example, a mobile device (e.g., mobile phone), may have an IMSI associated with its mobile interface, a MAC address associated with its Wifi interface, a Bluetooth identity associated with it Bluetooth interface, and a UDID, among other identifiers. If the wireless reader 306 is configured with multiple protocol interfaces or if there are multiple wireless readers at location L1, each of which is capable of reading each of the wireless identifiers, then multiple WD IDs could be read from a single wireless device. In certain circumstances, a credit reader 308 may be at the location L1. Hence, at time t1 when the WD IDs are read by wireless reader 306, one or more credit card numbers from, for example credit cards A and B, may be read by credit card reader 308. This may occur, for example, at a grocery store check-out cashier station. The time t1 may represent an instant in time or actual time, e.g., Coordinated Universal Time (UTC) or UNIX time. The time among various system components may be implemented and/or synchronized via, for example, one or more of the network time protocol (NTP), GPS, Chirstian's algorithm, Berkeley Algorithm, Precision Time Protocol, Synchronous Ethernet, Reference broadcast synchronization (RBS), Reference broadcast infrastructure synchronization (RBIS), clock sampling mutual network synchronization, and synchronization in Ad-hoc wireless networks. A period p1 may represent a reading period of time or window of time during which reading by the wireless reader 306 and/or credit card reader 308 reads identities from target wireless devices or credit card number from credit cards respectively at location L1. For example, the wireless reader 306 may initiate wireless reading of wireless devices at time 8:00.00 am. The duration or period of reading may be 30 seconds. Hence, the wireless reader will end its reading at 8:00.30 am. A wireless reader 306 may be configured to continuously, periodically, or in response to an action, perform readings of wireless devices within its reading range. An action may include a purchase at a store, credit card payment, ATM withdrawal, toll booth scan or payment, entry into a venue (e.g., building, stadium, etc.), and the like. If the reading period at t1 is short, e.g., 1 second, then credit card reader 308 would likely only read and/or detect one credit card number, e.g., CCa. But if the reading period at t1 is set at 1 minute, then credit card reader 308 may read and/or detect two or more credit card numbers, e.g., CCa and CCb.

FIG. 3B includes a diagram of the system 300 arranged to detect wireless devices WDa, WDb, WDc, WDf, and WDg and/or credit card A associated with user A at different time t2 (than t1) in the same location L1 or at a different time t2 (than t1) in a different location L2 (than L1). Wireless devices WDf and WDg may be in the possession of user C, while wireless devices WDa, WDb, and WDc may be in the possession of user A. In this instance, system 300 includes wireless reader 310 and credit card reader 312. In the scenario where the location is the same, wireless reader 310 is the same as wireless reader 306 and credit card reader 312 is the same as credit card reader 308. In the scenario where the location L2 is different from location L1, the wireless reader 310 is different than wireless reader 306 and credit card reader 312 is different than credit card reader 308. While FIGS. 3A and 3B refer to credit cards and credit card readers, other types of cards may be used such as loyalty cards, library cards, badges, and so on. The duration or period p2 of reading at location L2 may be the same or longer or shorter than period p1 at location L1. The detection period or reading period may be dynamically adjustable based on, for example, vehicle traffic patterns on a street or human traffic patterns at a train station during a day, week, month, or year. For instance, the volume of vehicles on a road or volume of humans at a train station is usually substantially larger during commuting hours than off-peak hours. Hence, the reading period at a particular time (t1 or t2) may be adjusted to a shorter period, e.g., 10 seconds, during peak commuting, but adjusted to a longer period, e.g., 10 minutes, at off-peak times.

In certain instances, a credit card reader may function as a wireless reader and vice versa. In certain instances, a credit card may include a wireless interface and function as a wireless device. While FIGS. 3A and 3B refer to identities related to credit cards and wireless device identities, the user associating and tracking techniques disclosed herein may apply to other identities such as, for example, optical scan codes, universal product codes (UPCs), QR codes, PAM codes, and/or barcodes. An optical scanner, optical sensor, camera, video sensor, infra-red sensor, motion sensor, electromagnetic sensor, acoustic sensor, and any device capable a reading identifier information from a device and/or item may be a reader capable of interfacing with system 100 and/or 300 to enable detection and user associations as described herein. In some implementations, a wireless reader 112 includes an optical, visual, acoustic, and/or electromagnetic reader.

Figure 4A:
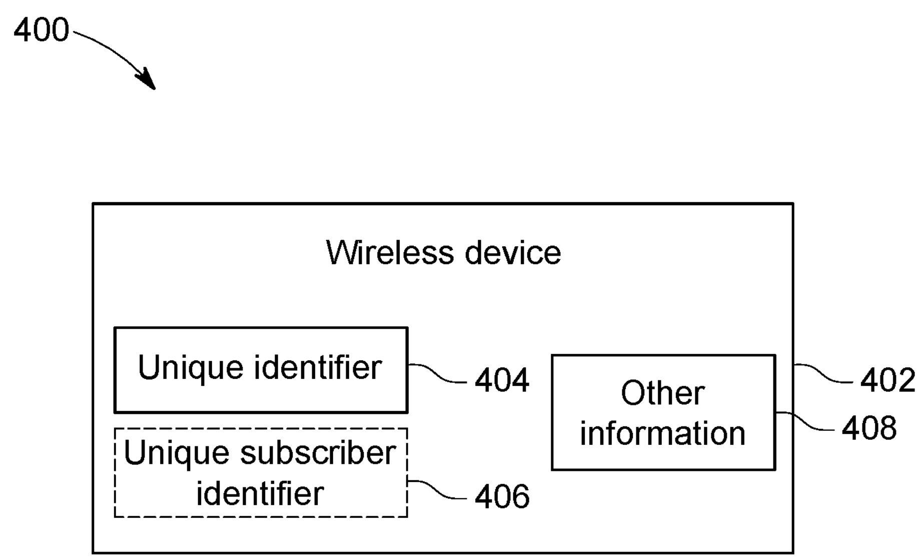

FIG. 4A includes a diagram 400 of a wireless device (WD) 402 including a unique identifier 404, a unique subscriber identifier 406, and other information 408. The unique identifier 404 and unique subscriber identifier 406 may include a WD ID as described previously herein. The other information 408 may include other WD 402 related information such as, without limitation, subscriber (user) name, subscriber account and/or billing information, subscriber network provider, related account information, subscriber mailing address, subscriber contact information, WD usage history, subscriber purchase history, subscriber call history, subscriber data usage history, subscriber location history, and so on. Certain information, such as the unique subscriber identifier 406, may be located within a SIM chip/card that is detachably insertable within the WD. The SIM chip may utilize cryptographic encryption and authentication to protect certain subscriber information. Certain information, such as the unique serial number 454 and/or a cryptographic secret key (for encryption and/or authentication), may be located within a SIM chip/card.

Figure 4B:
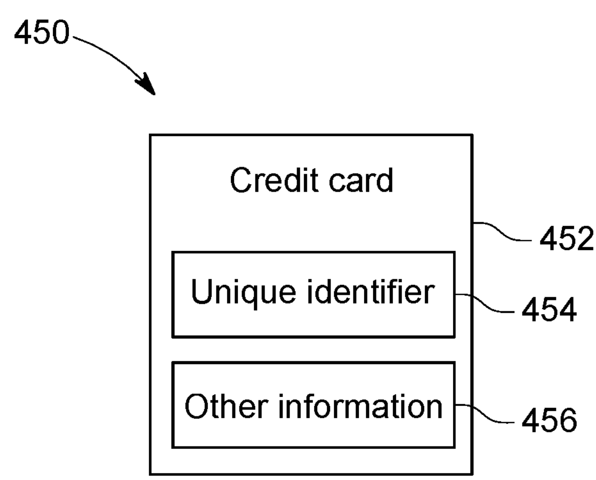

FIG. 4B includes a diagram 450 of a credit card 452 including a credit card unique identifier 454 and other information 456. The credit card unique identifier 454 may include a unique serial number used to validate the credit card during purchases. The other information 456 may include other credit card 452 related information such as, without limitation, subscriber (user) name, subscriber account and/or billing information, subscriber network provider, related account information, subscriber mailing address, subscriber contact information, credit card usage history, subscriber purchase history, subscriber call history, subscriber data usage history, subscriber location history, and so on. Certain information, such as the unique serial number 454 and/or a cryptographic secret key (for encryption and/or authentication), may be located within a SIM chip/card embedded within the credit card. The SIM chip may utilize cryptographic encryption and authentication to protect certain subscriber information. In some implementations, credit card information is stored within the WD 402 instead of or in addition to storage on a credit card 452. In this way, a WD 402 user is able to use the WD 402 as a credit card 452 during purchases. In such a circumstance, a wireless reader, such as WR 112, may be configured to read credit card related information from a WD 402 in addition to reading WD 402 related unique identifiers (e.g., WD IDs).

Figure 5A:
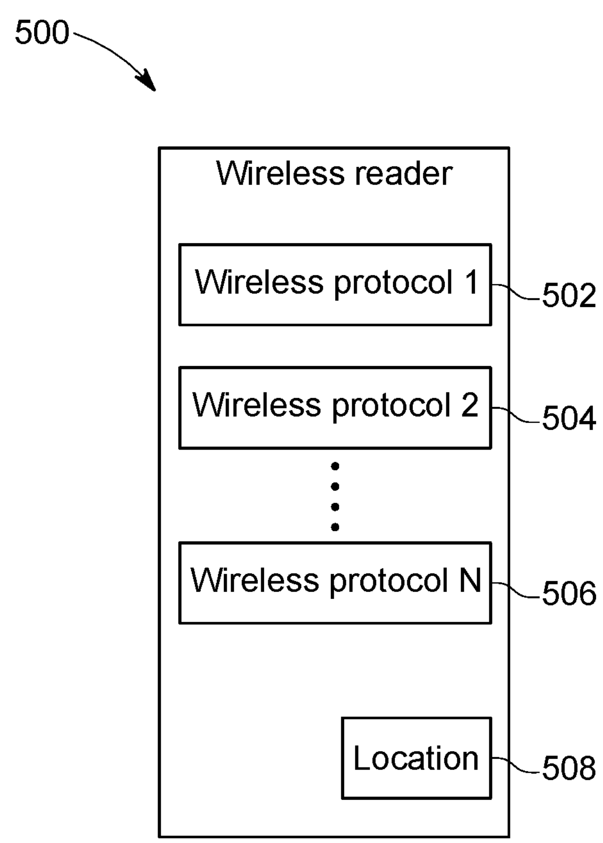

FIG. 5A includes a block diagram of a wireless reader 500 including multiple wireless protocol interfaces 502, 504, and 506. In some implementations, the wireless reader 500 is configured as a single device including multiple wireless protocol interfaces 502, 504, and 506. For example, a wireless reader 500 may be positioned at a check out cashier station at a grocery store, a cashier station at a retail store, at a concession stand in a sports stadium, at a busy intersection in a city. The wireless reader 500 may include, for example, an LTE reader, an 802.11 reader, a Bluetooth reader, and an RFID reader. Each reader may operate as a passive reader (protocol/network sniffer), as an active wireless network emulator (WNE), as a data provider emulator (DPE), or a combination of passive and active readers. Each wireless protocol interface 502, 504, and 506 may be configured to continuously scan signaling channels within the vicinity (within range of their respective interfaces) of wireless reader 500 to continuously capture WD IDs from wireless devices. In some circumstances, the wireless reader 500 may mimic a wireless network and initiate one or more wireless procedures with a WD that provides identity information to the wireless reader 500. For example, if wireless protocol interface 502 includes a mobile LTE and/or GSM protocol, the wireless reader 500 may configure the interface 502 in a way (e.g., present a new VLR area) to trigger a Location Update process where a wireless device (e.g., an LTE/GSM capable mobile station) sends its TMSI to the wireless reader 500. The wireless reader 500 may initiate other procedures, such as a TMSI unknown notice, to illicit a wireless device to provide its IMSI to the wireless reader 500.

In other instances, the wireless reader 500 may passively scan signaling channels (e.g., access and/or control channels) of a wireless network to capture WD IDs as wireless devices register with a wireless network and/or other wireless devices. The wireless reader 500 may include a computer, such as described with respect to FIG. 2. The wireless reader 500 may include a clock and/or timer. In certain configurations, the wireless reader 500 records the time, e.g, via a time stamp, when one or more unique identifiers are captured/detected (i.e., during a particular detection event). The wireless reader 500 may capture other information 408. The wireless reader 500 may store the detected WD IDs and other information 408 within a local storage and/or memory along with a time stamp. The wireless reader 500 may also store information identifying the wireless reader 500 and/or identifying the location of the wireless reader 500 along with the detected unique identifiers. Some portion or combination of the above information may be transmitted to a server, such as server 102 and/or server 1202, for storage and processing/analysis.

In some implementations, instead of a single wireless reader 500 including multiple wireless protocol interfaces, one or more wireless readers 500, each of which having one or more wireless protocol interfaces, may be positioned at or about the same location to enable detections of WD IDs. The multiple wireless readers 500 may communicate and cooperate to enable concurrent detection of WD IDs. The multiple wireless readers 500 may operate in a master-slave configuration where one wireless reader 500 controls the operation of other wireless readers 500. In some configurations, one wireless reader 500 may receive and store detection event data from multiple wireless readers.

In certain implementations, a wireless reader 500 may activate a wireless protocol interface 502 periodically. In some implementations, a wireless reader 500 may continuously perform passive scanning (sniffing) of signaling channels, while periodically operating as a wireless network emulator (WNE). By periodically operating as a WNE, the wireless reader 500 can efficiently capture WD IDs, but also minimize disruption of a wireless device's ability to interface with the local wireless network and, thereby, minimize any possible disruption of service to the wireless device. For example, the wireless reader 500 may activate a WNE associated with wireless protocol interface 502 (e.g., GSM interface), for 10 seconds every 1 minute. In this way, the WNE can efficiently illicit GSM identifiers about 10% of the time, while allowing GSM mobile handsets the opportunity to access the actual GSM network 90% of the time. Such a detection process would likely not be noticed by GSM handset users. The amount of time of WNE activation may vary and may be dynamically adjustable based on time of day, environmental conditions, whether an event is in progress, the number of expected wireless devices at certain times, and so on. For example, at a concession stand, the activation time may be set at 10 seconds (portion) every 5 minutes (period). The activation time may be configured to include any portion of a detection or reading period of 1 second, 10 seconds, 30 seconds, 1 minute, 10 minutes, 30 minutes, 1 hr, 8 hrs, and 24 hrs period, and so on.

The wireless reader 500 may initially perform passive scanning of signaling channels for WD IDs, but then initiate active scanning via a WNE to obtain additional WD IDs from a wireless device. For example, a wireless reader 500, via wireless protocol interface 502, may detect a GSM mobile handset TMSI during a registration request by a GSM handset via passive scanning, but then initiate active scanning by activating a WNE (GSM network emulator) via the wireless protocol interface 502 to induce the GSM mobile handset to send its IMSI to the wireless reader 500 (e.g., via cleartext IMSI transmission in response to TMSI-old unknown message from a WNE). Hence, a wireless reader 500 may activate a WNE (or DPE) in response to a trigger event. The trigger event may include passive detection of a unique identifier known to be associated with one or more other identifiers that can be acquired/detected via active scanning using a WNE and/or DPE. A trigger event may include the receipt of other information, such as, mobile device iOS version, software version, subscriber information, application information, application version information, other information 408, and so on.

A wireless reader 500 may include location functionality 508 and determine its own location via any one of the location functionality techniques described with respect to FIG. 1. Location information may be input into a memory of wireless reader 500 during manufacture or installation of the wireless reader 500 at a particular location. The location information may be input via a user interface or data interface. Location information for wireless reader 500 and other wireless readers may be stored at a server 103 and/or 1202.

In certain implementations, a wireless device, e.g., WDa, may include a wireless reader 500. For example, where WDa is a GSM handset with an RFID reader, WDa may function as a typical GSM handset, but also function as a wireless reader 500. WDa, in this instance, may include a GSM passive scanner, a GSM active scanner (WNE), a Bluetooth active and/or passive scanner, a Wifi (802.11) active/passive scanner, and an RFID reader. Because WDa is a mobile device, WDa may determine its location via location functionality 508 (e.g., via GPS) concurrently during a detection event when one or more WD IDs are detected/captured. In some configurations, a wireless device WDa may periodically function as a wireless reader 500. In some configurations, a wireless device WDa may continuously function as a wireless reader 500. In certain implementations, WDa may periodically or continuously transmit its location information to server 103 and/or 1202. Depending on the received location information from a wireless device WDa, the server 103 and/or 1202 may transmit an instruction to WDa to activate its wireless reader 500. Based on received location information from WDa, the server 103 and/or 1202 may determine that it is useful to detect wireless devices in the vicinity of WDa (in the location of the WDa). For instance, law enforcement may desire information about users in a particular location without fixed wireless readers, such as an area of spectators along a marathon route. Server 103 and/or 1202 may include an application tracking known wireless devices configured to function as wireless readers 500. The application may provide a user interface showing the location of the mobile wireless readers and allow selection of an appropriate wireless device to be activated to detect WD IDs at its location. The application may automatically activate one or more wireless readers in one or more wireless devices based on location information associated with the wireless devices.

Aside from the above example, there are numerous technical and commercial advantages to implementing wireless readers 500 in wireless devices. For instance, in exchange for allowing their wireless device to function as a wireless reader 500, a consumer may receive payments from a marketing entity for the information (e.g., WD IDs, locations, times, etc. . . . ) provided to the entity. A wireless device user could receive discounted services and/or a discounted wireless device in exchange for allowing their device to function, at least part time, as a wireless reader 500.

Figure 5B:
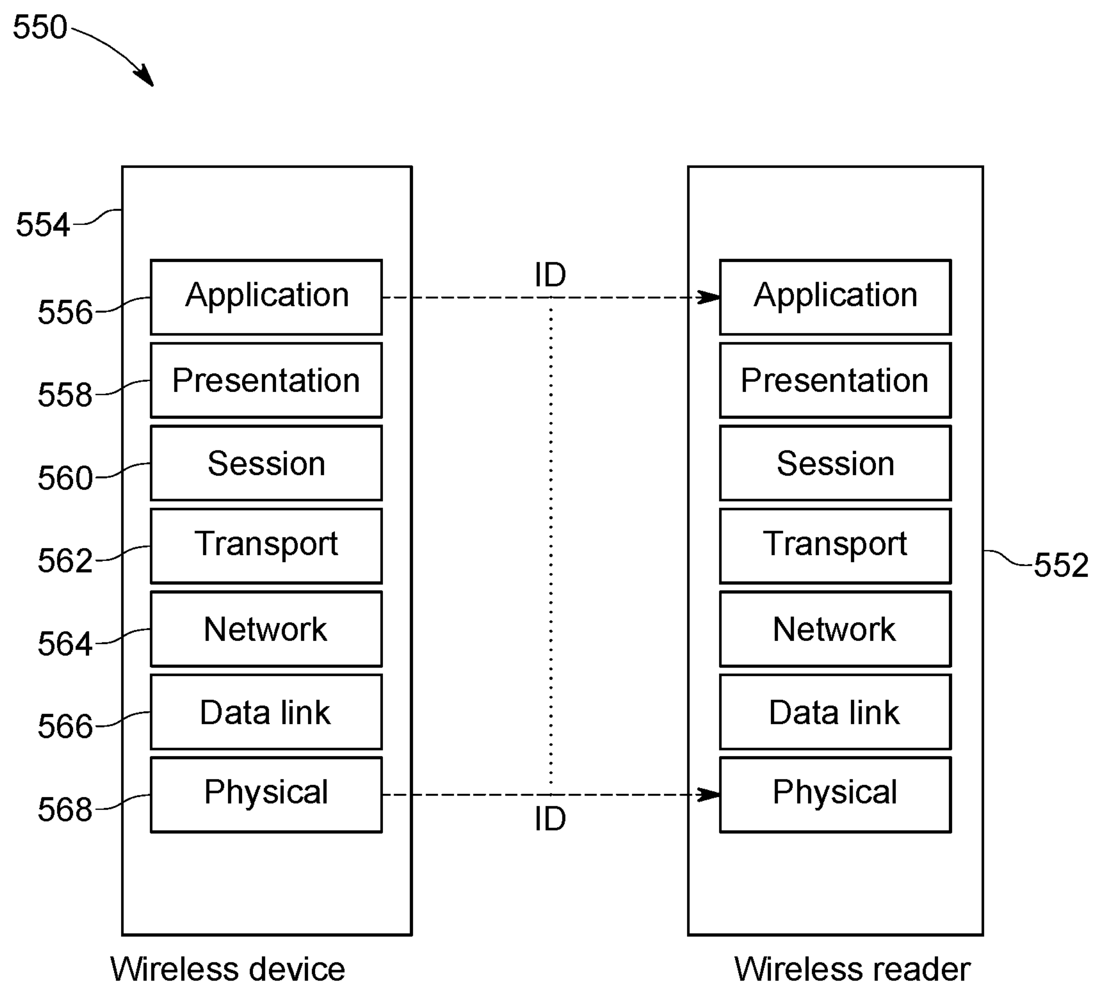

FIG. 5B includes a diagram 550 illustrating wireless reader 552 detecting one or more wireless identifiers via one or more OSI layers 556-568 from a wireless device 554. As previously discussed, a wireless device 554 may include multiple unique identifiers. The unique identifiers may be associated with applications, services, routines, functions, or features of a wireless device operating at various layers of the OSI network model. For instance, a MSID or telephone number may be considered a unique identifier associated with the network layer 564, data link layer 566, and physical layer 568 of a mobile network. A UDID or CFUUID may be considered a unique identifier associated with an application running at the application layer 556. In some implementations, a wireless reader 552 and/or 500 is configured to passively or actively detect one or more unique identifiers at any layer of the OSI network model. As a passive scanner, a wireless reader 552 may scan signaling channels of a wireless network to detect WD IDs at various OSI layers. As an active scanner, a wireless reader 554 may implement a WNE and/or DPE to illicit WD IDs from a wireless device 554. In some circumstances, WD IDs may be protected from detection and/or capture by encryption of a signaling and/or traffic channel of a wireless network. In instances where mutual authentication is not employed between a wireless network and wireless device (or between applications and services at the application layer), a wireless reader 552 may mimic a wireless network provider or data service provider (via a WNE or DPE) to obtain unique identifiers (e.g., WD IDs). In some implementations, a wireless reader 552 may include cryptographic information (i.e., a secret key and/or public key information) of a wireless service provider and/or data provider that enables a wireless reader to decrypt encrypted signaling information and/or data packets including a WD ID or other information related to a wireless device (or an application or client running on a wireless device). One or more wireless readers 552 may be configured to include cryptographic secrets keys and/or other security information to enable a wireless reader to mimic a data service.

In certain implementations, a wireless reader 552 may obtain sufficient information via a passive or active scan of data within a network protocol stack to identify a service being provided to a wireless device 554, but not have access to unique identifiers where, for example, the data session and/or application layer information is protected by encryption (e.g., an SSL tunnel). The wireless reader 552 may transmit detection event information (such as detected WD IDs, time stamps, locations, and other information) to a server associated with the identified service. For example, the wireless reader 552 may identify that wireless device 554 initiated an iTunes® session and/or accessed an iTunes® server, but be unable to detect an iTunes® or Apple® related unique identifier because the iTunes® session and/or packets are protected by encryption. By sending the detection event information to an Apple® and/or iTune® server, the server, such as server 103 and/or 1202 (or another server), may correlate the detection event information received from the wireless reader 552 (including WD IDs associated with a wireless network) to the service request received by the server providing an application layer application at about the same time. Hence, the application layer service provider of the application, e.g., iTunes®, now has real-time or near real-time information regarding the location of its subscribers. The application layer service provider may also have the ability to record a history of all locations and items within the possession of a consumer associated with wireless device 554 of a period of time. The application layer service provider may also receive information about other devices and/or items associated with a particular subscriber (i.e., the items and devices identified by the WC IDs associated with the subscriber) at a particular time or a history of items over a period of time. In some implementations, a wireless reader 500 and/or 552 may store information associated multiple detection events for a period of time and send such information to a server 103 and/or server 1202 for processing.

Figure 6:
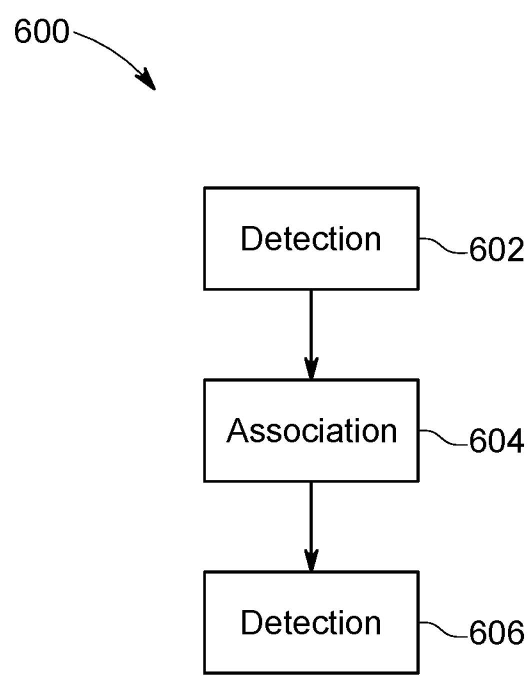

FIG. 6 includes a block diagram illustrating a process 600 for detection 602, association 604, and detection 606 of wireless devices. The initial detection phase 602 involves detecting wireless devices, e.g., WDa-WDe at a location by a wireless reader 306, 500, and/or 552. Because the multiple devices WDa-WDe may be associated with multiple users A and B, it would be preferable for a system, such as system 100 and/or 300, to perform two of more detection events as illustrated and described with respect to FIGS. 3A and 3B. Hence, the initial detection phase 602 may involve a second (and further) detection events where wireless device identifiers at detected/captured at different times and/or different locations. With at least two detection events, process 600 can move to association phase 604 that enables the system 300 to identify and associate a set of WD IDs with a first user A. The association of a set of WD IDs with the first user A may be achieved by comparing the detected set of WD IDs in a first detection event with a detected set of WD IDs in a second detection event. The matching WD IDs between the first and second event can be determined to be associated with a user A. Once a set of WD IDs are associated with a user A, the system 300 can transition to a tracking detection phase 606 where wireless readers 112, 306, 310, 500, and/or 552 are able to detect the location of user A by detecting one of more of the WD IDs that are associated with user A.

In certain configurations, the system 100 and/or 300 may assign and consider a level of assurance and/or a level of confidence associated with detection of a user such as user A based on the number of WD IDs (i.e., the number of detected wireless devices) detected during a detection event.

For example, if five WD IDs are known to be associated with a user A (i.e., previously associated with user A) and all five WD IDs are detected during a detection event, the system 300 will have a high level of assurance and/or confidence that user A has been detected at a particular location at a particular time. But if only two of five known WD IDs are detected (when detection of all five is possible due to the presence of wireless readers capable of detecting all five WD IDs), then system 300 may be considered to have a low level of assurance and/or confidence that user A has been detected.

System 100 and/or 300 may give greater or lesser weight to certain WD IDs based on the type of device and/or item associated with a WD ID. For example, a WD ID such as a mobile telephone number or MSID may be given a higher weight than an RFID for a prescription drug container. A WD ID associated with a mobile telephone may be given a higher weight because mobile telephone users often keep their mobile telephone numbers for long periods of time (e.g., years) including transferring their mobile telephone number to new mobile telephones. In contrast, a user may only carry a particular prescription drug bottle for a relatively short period of time (e.g., a week). Hence, a WD ID associated with a prescription bottle may be assigned a relatively low weight. A weight may be a multiplier applied to a WD ID. A weight may correspond to how often and/or how long a user is expected to possess an item or device having a WD ID, where a weight is greater for a type of item or device expected to be possessed more often and/or for a longer period of time.

A weight scale of 0.0-1.0 may be used. Thus, if there are three WD IDs associated with user A where the first WD IDa is a mobile telephone number, the second WD IDb is for Bluetooth ID for a watch, and the third WD IDc is for a prescription bottle, system 100 and/or 300 (via server 103 and/or 1202) may assign the following weights: WD IDa weight=0.9, WD IDb weight=0.5; WD IDc weight=0.3. If all three WD IDs are detected during a detection event, system 300 may calculate a level assurance=0.9 (1)+0.5 (1)+0.3(1)=1.6. If only WD IDa is detected, the level of assurance=0.9 (1)+0.5(0)+0.3(0)=0.9. If only WDb and WDc are detected, the level of assurance=0.9(0)+0.5(1)+0.3(1)=0.8. If only WDb is detected, the level of assurance=0.9(0)+0.5(1)+0.3 (0)=0.5. If only WDc is detected, the level of assurance=0.9 (0)+0.5(0)+0.3(1)=0.3. For these examples, a binary 1 indicates a WD ID was detected and a binary 0 indicates that a WD ID was not detected. The system 300 may set a threshold level of assurance to determine that user A is present. For example, if the threshold level is set at 0.75, then system 300 determines that user A has been detected in all instances above except when only WDb and when only WDc are detected because the total level of assurance in those instances is less than the threshold of 0.75. The threshold level may be configured by a system 300 (server 103 and/or 1202) operator and/or dynamically adjusted based on a desired level of assurance for tracking wireless device users. Other forms of weights and/or modifiers may be applied as known by one of ordinary skill to adjust the influence of certain types of wireless devices on a determination of user presence during a detection event at a particular location.

In some implementations, the system 100 and/or 300 may designate primary wireless device identifier WD IDp among a set of WD IDs associated with a user. The primary WD IDp may be selected based on the expected duration, detectability, and/or consistency of use of the WD ID. For example, a WD ID associated with a mobile handset such as an MSID that is readily detectable and is expected to be used be a user for an extended period of time (i.e., 5 or more years) may be designated as a WD IDp. During the tracking detection phase 606, the system 100 and/or 300 may search for the WD IDp to track a user. But, the system 100 and/or 300 may continue associate all identifiers detected with a user to gather information about devices and items used and/or possessed by the user. Also, the WD IDs other than the designated WD IDp may be used as fallback identifiers to continue to track a user if/when the user discontinues use of the designated WD IDp.

The process 600 also advantageously allows for the association of WD IDs to a user to evolve over time (to be described later with respect to FIG. 7G) such that the WD IDs associated with a user can change while the system 100 and/or 300 effectively continues to track the movement, purchases, items, devices, interactions with other users, and other information associated with a user. The initial detection phase 602, association phase 604, and tracking detection phase 606 can be continuously repeated. Also, the various phases may overlap and/or occur concurrently on an ongoing basis. For instance, detection events may be used by system 100 and/or 300 as part of phase 602 to associate WC IDs with a user, or update the association of WC IDs with a user via phase 604, but also used as part of phase 606 to track and detect the presence of a user at particular times and/or locations. Hence, in certain implementations, phase 602 detection and phase 606 detection may include the same detection event using the same wireless reader(s), but the detected information may be used differently; used for the association phase 604 and/or used for tracking a user.

FIG. 7A shows a detection table 700 including credit card numbers CCa and CCb and wireless device identifiers WD IDa, WD IDb, WD IDc, WD IDd, and WD IDe detected at a first time t1 and first location L1. The detection table 700 is exemplary of a record, listing, and/or set of data that may be stored in a database, memory, and/or storage associated with system 100 and/or 300 (i.e., detection event data and/or information). The detection table 700 may be stored in a storage associated with server 103, server 1202, a wireless reader, and/or other device associated with system 100, 300, and/or 1200. The detection table 700 may be stored in an electronic storage accessible by a server 103, server 1202, and/or wireless reader such as, for example, identity database 1206. While FIG. 7A illustrates one arrangement of data in table 700. The data or information associated with table 700 (and any other data table described herein) may be configured, stored, and made accessible in any number of ways known to those of ordinary skill in the art. For example, any data stored as part of system 100 and/or 300 and table 700 may be configured as part of an SQL database or other relational database. The detection table 700 is an example of a database record and/or listing based on the detection event illustrated in FIG. 3A. The wireless device identifiers illustrated in FIG. 7A may be detected and recorded by wireless reader 306. The credit card numbers CCa and CCb illustrated in FIG. 7A may be detected and recorded by credit card reader 308. Detected WD IDs and/or detected credit card numbers may be transmitted from their respect readers to, for example, server 103 and server 1202 during each detection event. In some implementations, a reader may store detected WC IDs and/or credit card numbers for a period of time locally and then transmit detected information to server 103, server 1202, and/or database 1206. The detection table 700 may include other information 408 and 456 (not shown) including period p1 data, time stamp, and location. The data stored in table 700 and/or any data detected by a wireless reader during a detection event may be considered detection event data or information.

The system 100 and/or 300 may be configured to track anonymous consumers and/or users (i.e., perform anonymous tracking). In such a configuration, the system 100 and/or 300 does not record or store certain information that may indicate the actual (or real) identity of a user such as a user's name, address, social security number, and so on. Instead, the system 100 and/or 300 may assign a serial number or other identifier, preferably unique, to each user. In certain implementations, the system 100 and/or 300 may record information indicative of a user's actual identity, but encrypt and/or mask such information. In certain implementations, the system may allow a user's encrypted and/or masked identity information to be decrypted or revealed to an authorized entity under certain circumstances (e.g., law enforcement). Where legal privacy issues are a concern, system 100 and/or 300 may advantageous provide tracking of users without exposing actual user identities. Such anonymous tracking may be useful for developing intelligence on consumer purchasing trends, purchasing based on user demographics (age, sex, education, etc. . . . ), travel habits, social interactions, social media usage, retail product associations (e.g., a portion of users that possess item A typically also possess items B and C), media consumption, consumer migration, consumer movement statistics in a city or region, traffic patterns, and so on. For example, a city planner could analyze data collected by system 100 and/or 300 over a period of time to identify the most frequently used mode of transportation (and choke points) into and out of a city on a daily basis. Based on such analysis, city planners could increase the number of trains scheduled to arrive/depart at certain times, and/or widen certain roads, adjust traffic signals to improve commuter flow in and out of the city. Anonymous consumer tracking may enable the creation of consumer and/or marketing registries, which may enable beneficial data mining and analysis of various data associated with consumers (perhaps in a similar manner as medical clinical registries in healthcare).

Alternatively, the system 100 and/or 300 may track users including associating identifiers with actual user identities such as, for example, user name, address, social security number, etc. . . . . In some implementations, table 700 may include other information in 408 and 456 including certain information that may indicate the actual (i.e., real) identity of a user such as a user's name, address, social security number, and so on. By identifying actual identities of users, user movements and associations of items and devices may be tracked in relation to the actual identity of a user. For example, instead of tracking the movements and associations of an anonymous consumer A, the system 100 and/or 300 tracks the movements and associations of "John Doe" of 20 Main St., Boston, Mass. By knowing the actual user identity of consumer A, system 100 and/or 300 (or server 103 or server 1202) may access other data sources via the Internet and/or other networks to obtain additional information regarding John Doe. Also, a marketer, a service provider, and/or entity with access to recorded data regarding John Doe may, based on identifying movement and/or association information from the recorded data (e.g., in database 1206), send advertisements, marketing materials, offers, and other information to John Doe.

FIG. 7B shows a detection table 702 including credit card numbers CCa and CCc and wireless device identifiers WD IDa, WD IDb, WD IDc, WD IDf, and WD IDg detected at a different time t2 in the same location L1 or at a different time t2 in a different location L2 than the first time t1 and first location L1. The detection table 702 is exemplary of a record, listing, and/or set of data that may be stored in a database, memory, and/or storage associated with system 100 and/or 300. The detection table 702 may be stored in a storage associated with server 103, server 1202, a wireless reader, and/or other device associated with system 300. The detection table 700 may be stored in an electronic storage accessible by a server 103, server 1202, and/or wireless reader such as, for example, identity database 1206. While FIG. 7B illustrates one arrangement of data in table 700. The information associated with table 702 (and any other data table described herein) may be configured, stored, and made accessible in any number of ways known to those of ordinary skill in the art. For example, any data stored as part of system 100 and/or 300 and table 702 may be configured as part of an SQL database or other relational database. The detection table 702 is an example of a database record and/or listing based on the detection event illustrated in FIG. 3B. The wireless device identifiers illustrated in FIG. 7B may be detected and recorded by wireless reader 310. The credit card numbers CCa and CCc illustrated in FIG. 7B may be detected and recorded by credit card reader 312. Detected WD IDs and/or detected credit card numbers may be transmitted from their respect readers to, for example, server 103 and server 1202 during each detection event. In some implementations, a reader may store detected WC IDs and/or credit card numbers for a period of time locally and then transmit detected information to server 103, server 1202, and/or database 1206. The detection table 702 may include other information 408 and 456 (not shown) including period p2 data, time stamp, and location.

FIG. 7C shows an association table 704 associating credit card A with wireless device identifiers WD IDa, WD IDb, and WD IDc. As discussed above, table 700 includes the unique identifiers detected during a first detection event illustrated by FIG. 3A. Table 702 includes the unique identifiers detected during a second detection event illustrated by FIG. 3B. FIG. 3A shows a first wireless reader 306 arranged to detect a first set of wireless device identities WD IDa, WD IDb, WD IDc, WD IDd, and WD IDe and credit card numbers CCa and CCb at a first time t1 and at a first location L1. FIG. 3B shows a second wireless reader 310 arranged to detect second set of wireless device identifiers WD IDa, WD IDb, WD IDc, WD IDf, and WD IDg and credit card numbers CCa and CCc during a second time period t2 at a second location L2. In one implementation, server 103, in electronic communication with the first and second wireless readers 306 and 310 via a network 102, receives the first set of detected identifiers WD IDa, WD IDb, WD IDc, WD IDd, WD IDe, CCa, and CCb from the first wireless reader 306 and credit card reader 308 and the second set of detected identifiers WD IDa, WD IDb, WD IDc, WD IDf, WD IDg, CCa, and CCc from the second wireless reader 310 and credit card reader 312. Server 103 and/or 1202 compares the first set of identifiers with the second set of identifiers. Server 103 and/or server 1202 identifies a matching set of identifiers including the matching wireless device identifiers WD IDa, WD IDb, WD IDc and credit card number CCa between the first set of identifiers and the second set of identifiers. For example, server 103 and/or server 1202, a processor such as CPU 202, may implement the following:

User_A_Set$_i$ = DE$_i$ ∩ DE$_{i+1}$
Where: DE = set of unique identifiers read at detection event (e.g., WD IDa, WD IDb, WD IDc, CCa).
i = ith detection event (e.g., i = 50 at 50$^{th}$ detection event).
i = 1, 2, 3, . . .
∩ means intersect
For example,
User_ A_Set$_i$ = (WD IDa, WD IDb, WD IDc, WD IDd, WD IDe,CCa, and CCb) ∩ (WD IDa, WD IDb, WD IDc, WD IDf, WD IDg, CCa, and CCc) = WD IDa, WD IDb, WD IDc, and CCa Server 103 and/or 1202 associates a user identity (e.g., user A) with the matching set of identifiers between detection events DE$_i$ and DE$_{i+1}$ including WD IDs and credit card numbers, or other identifiers.

FIGS. 7D through 7F illustrate storage of detection event information at server 103, server 1202, one or more wireless readers, and/or database 1206. But, unlike FIGS. 7A through 7C, only wireless device identifiers are tracked and stored by system 100 and/or 300.

FIG. 7D shows a detection table 706 including wireless device identifiers WD IDa, WD IDb, WD IDc, WD IDd, and WD IDe detected at a first time t1 and first location L1. Detection table 706 is similar to detection table 700 except that credit card identifiers are not recorded.

FIG. 7E shows a detection table 708 including wireless device identifiers WD IDa, WD IDb, WD IDc, WD IDf, and WD IDg detected at a different time t2 in the same location L1 or at a different time t2 in a different location L2 than the first time t1 and first location L1. Detection table 708 is similar to detection table 702 except that credit card identifiers are not recorded.

FIG. 7F shows an association table 710 associating first person (i.e., user or consumer) with wireless device identifiers WD IDa, WD IDb, and WD IDc. Similar to the example association process with respect to FIG. 7C, server 103 and/or 1202, in electronic communication with the first and second wireless readers 306 and 310 via a network 102, may receive a first set of detected wireless device identifiers WD IDa, WD IDb, WD IDc, WD IDd, and WD IDe from a first wireless reader 306 and a second set of detected wireless device identifiers WD IDa, WD IDb, WD IDc, WD IDf, and WD IDg from a second wireless reader 310. Server 103 and/or 1202 compares the first set of wireless device identifiers with the second set of wireless device identifiers. Server 103 and/or 1202 identifies a matching set of identifiers including the matching wireless device identifiers WD IDa, WD IDb, WD IDc between the first set of identifiers and the second set of identifiers. Hence, WD IDa, WD IDb, WD IDc are associated with consumer A (i.e., user A).

Figure 7G:
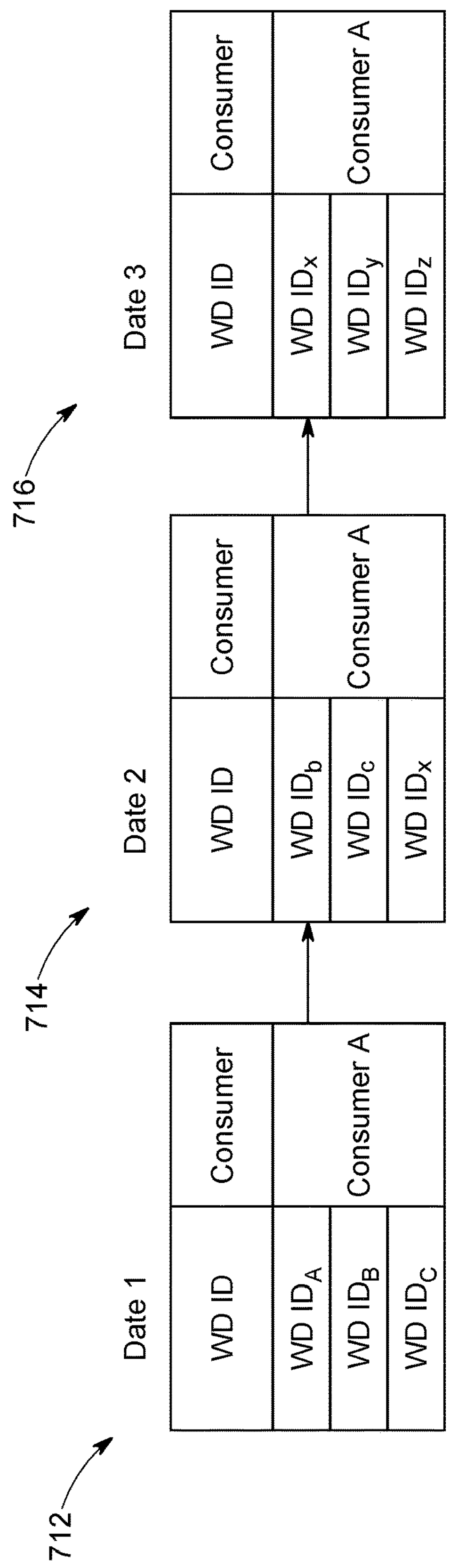
FIG. 7G illustrates an exemplary change in the wireless device identifiers being associated with a consumer over a period of time.

FIG. 7G illustrates an exemplary change in the wireless device identifiers being associated with a consumer (e.g., user A) over a period of time including an association table 712 on date 1, an association table 714 on date 2, and an association table 716 on date 3, where date 1 is before date 2 and date 2 is before date 3. On date 1, WD IDa, WD IDb, WD IDc are associated with consumer A. On date 2, sometime after date 1, WD IDx, WD IDb, WD IDc are associated with consumer A. This is expected as the needs of a consumer are expected to change over time. For example, a user may carry a purse including an RFID (e.g., WD IDa), a drug prescription bottle including an RFID (e.g., WD IDb), and a mobile telephone (e.g., WD IDc). By date 2, the user may replace their purse with a new purse (e.g., WD IDx). By date 3, the user may replace their drug prescription bottle with a new prescription bottle (e.g., WD IDy) and replace their old mobile telephone with a new mobile telephone having a new IMSI (e.g., WD IDz).

There are numerous ways in which server 103 and/or 1202 may track a consumer while allowing for the association of devices and/or items with identifiers to evolve over a period of time. The following methods 1, 2, and 3 are examples of association algorithms or methods that system 100 and/or 300 may use to establish and maintain associations for users. All of the methods generally include techniques of comparing detected identifiers between two or more detection events to associate identifiers with a consumer. By continuously detecting identifiers via detection events, the methods below enable the association of identifiers to a consumer to change over time as illustrated in FIG. 7G. Method 1 performs a windowed analysis of detection events where consecutive detection events are compared. Method 2 performs a windowed analysis of a more widely spread set of detection events. Method 3 performs a linked analysis of detection events over a period time while also enabling addition new identifiers over time.

Method 1 User_A_Set$_i$ = DE$_i$ ∩ DE$_{i+1}$ [∩ DE$_{i+2}$ . . . ]
Note: brackets indicate adjustable range of 2 or more detection events.
Method 2: User_A_Set$_i$ = DE$_i$ ∩ DE$_{i+n}$ [∩ DE$_{i+2n}$ . . . ]
Note: brackets indicate adjustable range of 2 or more detection events.
Method 3: User_A_Set$_i$ = DE$_i$ ∩ DE$_{i-1}$
User_A_Set$_{i+1}$ = [User_A_Set$_i$ ∩ DE$_{i+1}$] U [DE$_{i+1}$ ∩ DE$_{i+2}$]
Note: Initial detection event may be defined as DE$_0$.
Where: DE = set of wireless device identifiers or other identifiers read at detection event (e.g., WDa ID, WDb ID, WDc ID).
i = ith detection event (e.g., i = 50 at 50$^{th}$ detection event).
i = 1, 2, 3, . . .
n = 1, 2, 3, . . .
∩ means intersect
U means union Methods 1, 2, and 3 exemplary methods of enabling system 100 and/or 300 to associate devices and/or items having detectable identifier with a consumer. Statistical matching methods may be applied additionally or alternatively such as, without limitation, statistical matching models including data fusion, data merging, synthetic matching, conditional logistic regression, paired difference test, McNemar test, or Cochran-Mantel-Haenszei test, and/or regression analysis model-based approaches. These methods illustrate techniques for associating devices and/or items with a consumer even as such devices and/or items in the possession of a consumer may change over a period of time.

Figure 8:
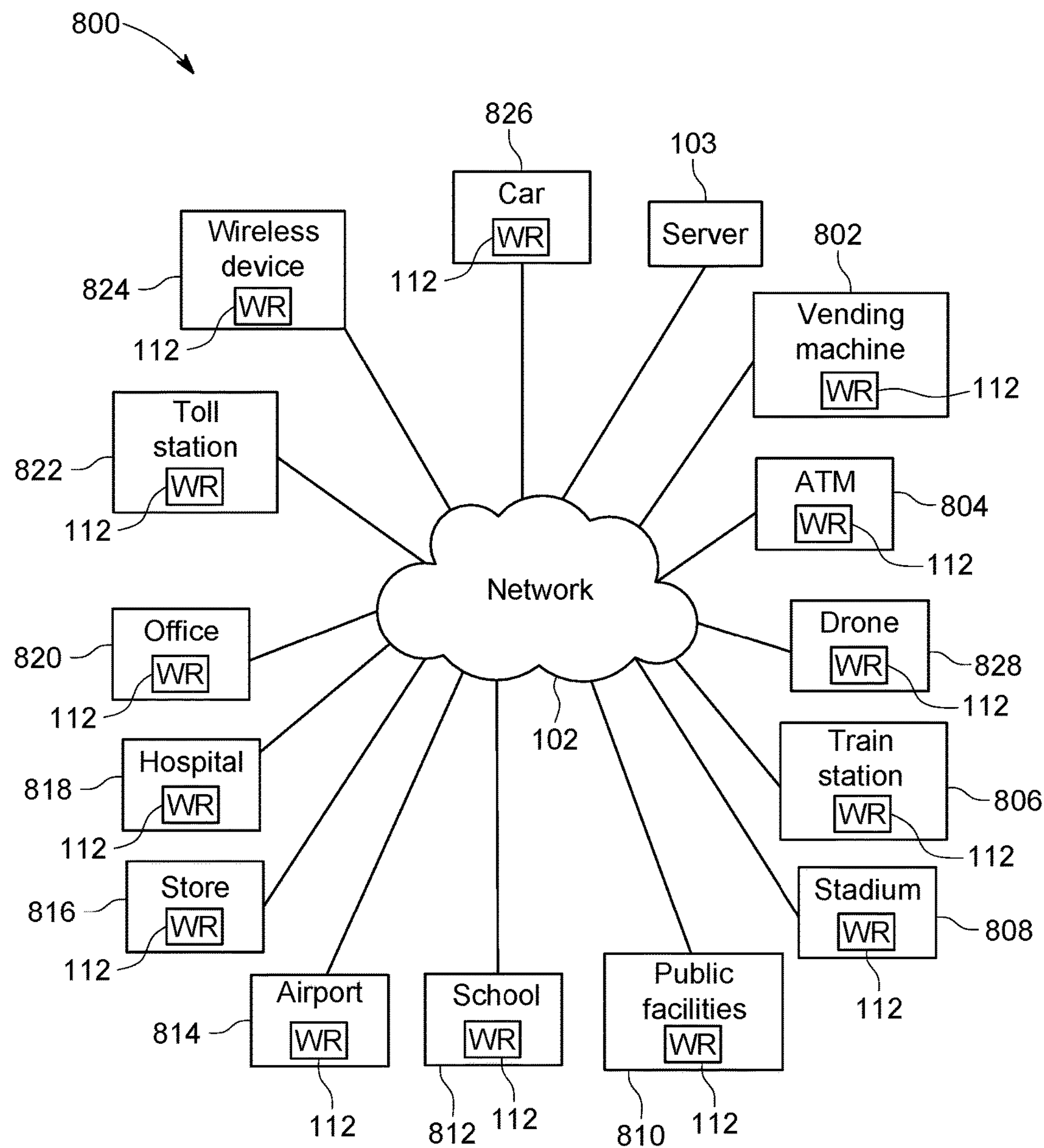
FIG. 8 shows a data network including wireless readers at various venues, locations, and/or devices and a server for processing data gathered from the various wireless readers.

FIG. 8 shows a data network 800 including wireless readers 112 at various venues, locations, and/or devices and a server 103 for processing data gathered from the various wireless readers 112. As illustrated in FIG. 8, a wireless reader 112 may be located at any location including, without limitation, a vending machine 802, ATM 804, train/bus station 806, stadium 808, public facilities 810, school 812, airport 814, store 816, hospital 818, office 820, toll booth/station 822, wireless device 824, an automobile or other transport vehicle 826, and a drone 828. Each wireless reader 112 may include functionality as described with respect to FIG. 2 to enable the wireless reader 112 to determine its location and time. In some implementations, a wireless reader 112 may obtain location and/or time information from its associated venue and devices 802-828.

In some implementations, a wireless reader may be configured with location information via a user or data interface. In yet other implementations, server 103 and/or 1202 may store location information for one or more wireless readers 112. In some configurations, one or more wireless readers 112 will send detection event data in real time or near real time to server 103 and/or 1202, which may assign a time stamp to such detection event data.

Figure 9A:
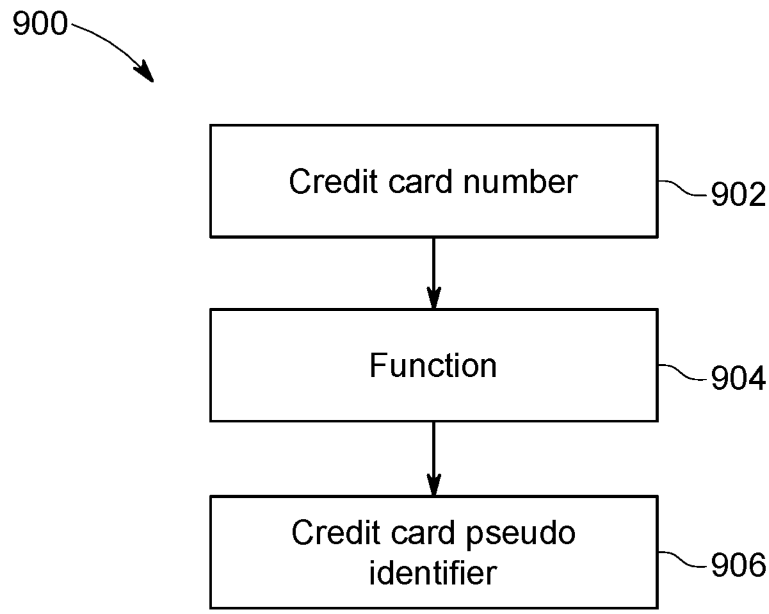
FIG. 9A illustrates the generation of a pseudo-identifier for a credit card.

FIG. 9A illustrates a process 900 for the generation of a pseudo-identifier 906 from a credit card number 902 using a function 904. Server 103 and/or 1202 may store credit card information including credit card numbers. In certain circumstances, server 103 and/or 1202 may implement procedures to protect sensitive information such as credit numbers using, for example, encryption, masking, and/or one-way functions. In FIG. 9A, a credit card number 902 is processed by a function 904 to generate a transformed credit card number 906. The function may include encryption, masking, a one-way function, a hash function, and the like.

Figure 9B:
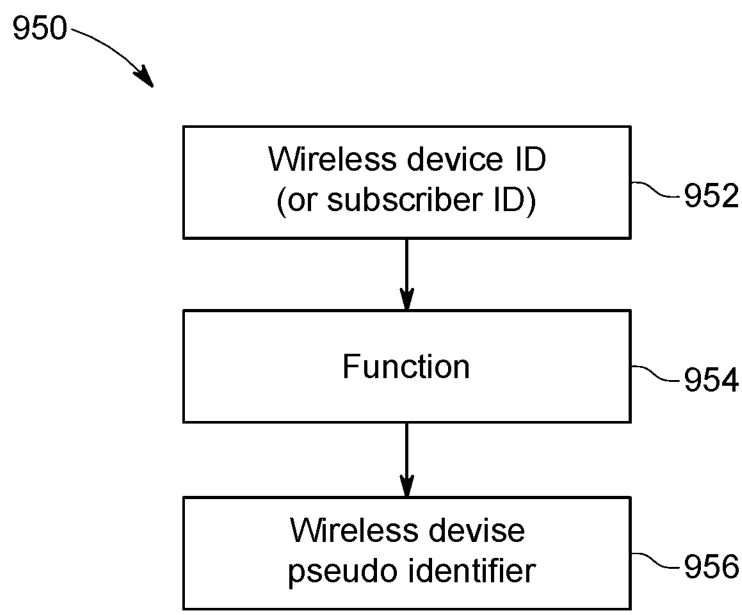
FIG. 9B illustrates the generation of a pseudo-identifier for a wireless device.

FIG. 9B illustrates a process 950 for the generation of a pseudo-identifier 956 from a wireless device identifier 952 using a function 954. Server 103 and/or 1202 may store wireless device information including wireless device identifiers (WD IDs). In certain circumstances, server 103 and/or 1202 may implement procedures to protect sensitive information such as WD IDs using, for example, encryption, masking, and/or one-way functions. In FIG. 9B, a wireless device identifier 952 is processed by a function 954 to generate a transformed wireless device identifier 956. The function may include encryption, masking, a one-way function, a hash function, and the like. Typical hash functions include MD5 and SHA-1.

Figure 10:
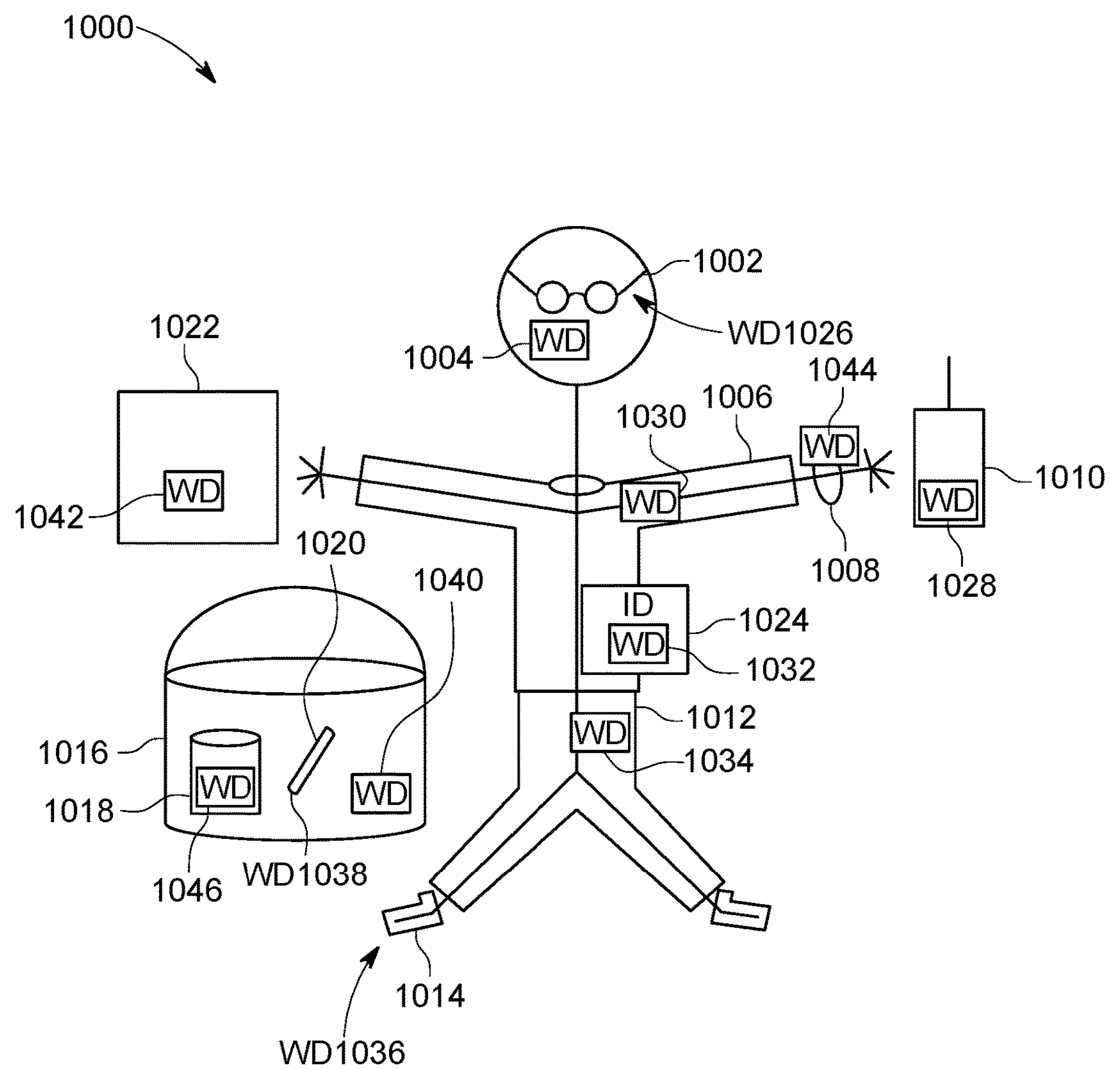
FIG. 10 shows a person in possession of multiple items, each of which including a wireless device.

FIG. 10 shows a person 1000 in possession of multiple devices and/or items, each of which including a wireless device. Without limitation, a person 1000 may be in possession of one or more wireless devices capable of being detected and/or read by a wireless reader of system 100 and/or 300. For example, user 1000 may have glasses 1002, a shirt 1006, a watch 1008, a phone 1010, pants 1012, shoes 1014, a purse 1016, a prescription or product container 1018, a pen 1020, and a document (e.g., passport) 1022. Each device may have a corresponding attached and/or embedded wireless device with a WD ID including WD IDs 1026, 1004, 1030, 1044, 1028, 1032, 1034, 1036, 1038, 1040, 1042, and 1046. WD ID 1004 may correspond to a RFID attached to or embedded within a portion of the body of user 1000. Recognizing that a mobile telephone handset itself is a wireless device, a mobile telephone handset may have multiple WD IDs based on supporting multiple wireless interfaces such as LTE, GSM, Wifi, Bluetooth, RFID, optical scanner, and camera capable of QR code reading.

Figure 11:
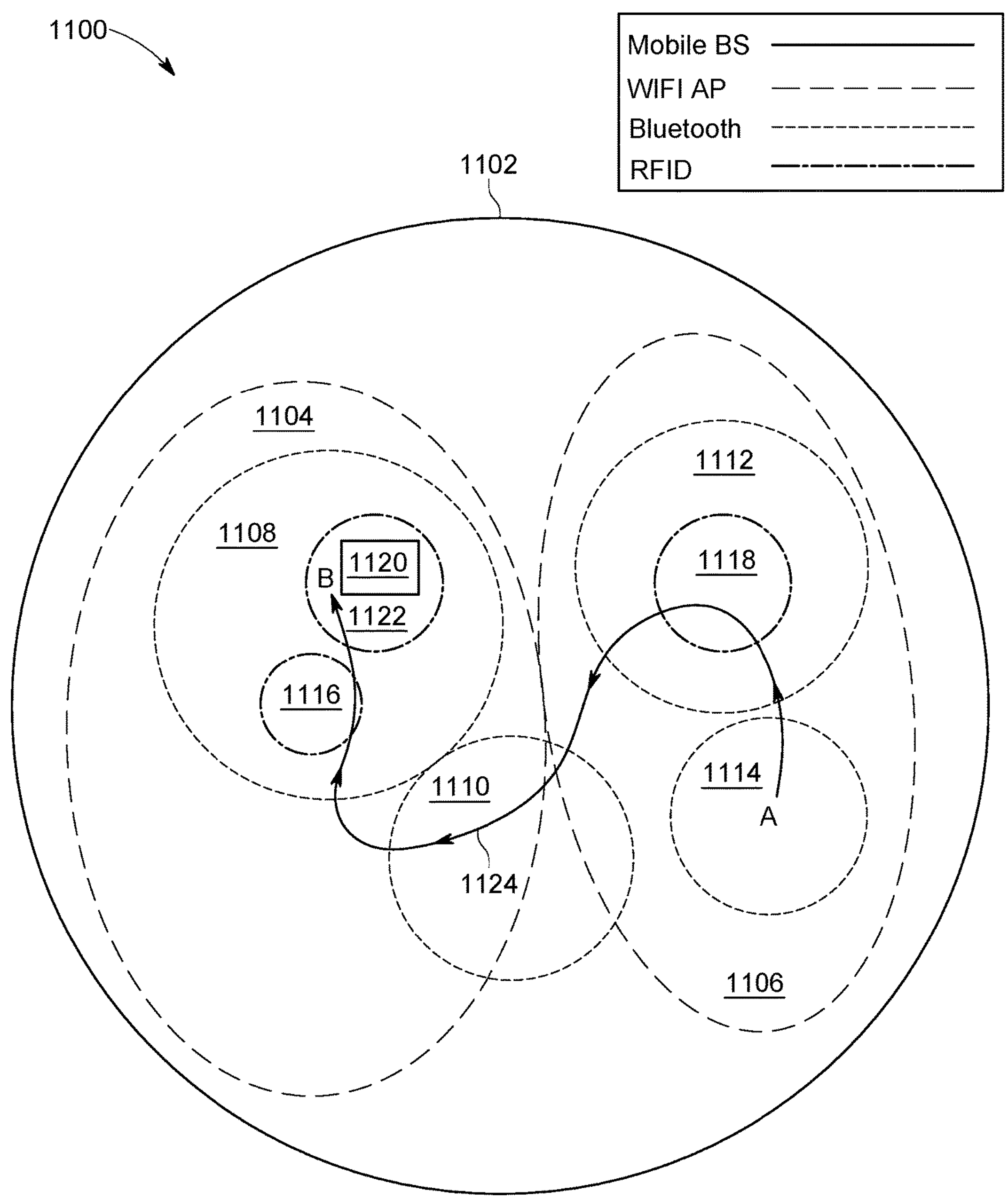
FIG. 11 shows an exemplary wireless device detection location including multiple overlapping wireless coverage zones associated with different wireless interfaces such as a mobile telephone protocol, Wifi protocol, and Bluetooth protocol.

FIG. 11 shows an exemplary wireless device detection location 1100 including multiple overlapping wireless coverage zones associated with different wireless interfaces such as: a mobile telephone protocol 1102; Wifi protocol 1104 and 1106; Bluetooth protocol 1108, 1110, 1112, and 1114; and RFID protocols 1122, 1116 and 1118. FIG. 11 also shows that one or more credit card readers 1120 may be located within a wireless device detection location, area, or zone 1100. The shape of the various detection areas is shown as round or oval in FIG. 11 for simplicity of illustration. One of ordinary skill will understand that the shape of wireless coverage may depend on environmental or atmospheric conditions, terrain, transmission power, reception sensitivity, orientation or configuration of transmitter and/or receiver antennas, and other conditions. FIG. 11 also shows a path 1124 taken by a user through the various overlapping coverage zones associated with the different wireless interfaces starting a point A at time t1 and ending at point B at the end of a detection period p1. The detection of identifiers at location 1102 starting at time t1 for a period of p1 may be a detection event. For example, if the coverage area 1102 covers a shopping mall, the period of p1 may be set to 10 minutes to allow for user A to travel from point A to point B. The detection event may start at time t1 (e.g., 1:00 pm). Because the detection period p1 is set to 10 minutes, the next detection event at t2 may be set at 1:10 pm for a ten minute period p2 or later. During the detection period p1, various wireless readers 112 associated with various wireless coverage zones will detect one or more WD IDs in the possession or vicinity of the user, e.g., user A. It is possible that the same WD ID may be detected by the same or different wireless readers in multiple instances during the detection period p1. For example, a wireless reader 112 for coverage zone 1102 related to a mobile telephone protocol may be configured as a passive scanner. During the detection period p1, the passive scanner may detect a WD ID associated with the mobile telephone interface multiple times (e.g., if user A attempts to originate multiple calls). In certain implementations multiple detections of the same identifier are considered redundant and the system 100 and/or 300 may record such identifier once during a detection period p1. As previously discussed, the detection period p1 can vary from nearly instantaneous to hours or days. To account for a lack of clock (time) synchronization (i.e., time drift) among multiple readers, a detection period p1 may be set at second or minutes (e.g., 5 seconds). In some implementations, multiple wireless readers have clocks or timers that are synchronized as discussed previously herein.

If coverage area 1102 covers a portion of a highway, the detection period p1 may be set at 10 seconds based on an expected higher rate of movement of user A from point A to B. Hence, the detection period may be configured based on the expect rate of movement of a user through a detection event location. In some configurations, the detection period decreases as the expected rate of movement of a user through a detection location increases. The detection period may be configured to minimize the amount of detected identifiers during a detection event (to minimize storage, network traffic, and/or data processing) and to minimize the possibility that identifiers associated with two users (e.g., user A and user B) are detected during the same detection event. Hence, the detection period may be reduced to short periods such as 1 second or less in certain circumstances. Regardless, even if identifiers associated with two or more users are detected during first and second detection events, the likelihood of it occurring during a third detection event would be extremely low. As the number of detection events used to established an association of identifiers with a user is increased ($3^{rd}$ DE, $4^{th}$ DE, $5^{th}$ DE, and so on to $N^{th}$ DE), the level of assurance that an association of identifiers with a user is accurate increases.

FIG. 11 also illustrates various overlapping coverage zones where various wireless readers are positioned in various positions within the location defined by zone and/or coverage area 1102. In certain implementations, the various wireless readers 112 associated with the various coverage zones are configured to coordinate to gather identifiers during one or more detection events. For example, all wireless readers 112 may communicate with a server 103 and/or 1202 to receive instructions and configuration information (e.g., t1 and p1) to perform detections during a detection event. In some aspects, a wireless reader 112 among the various wireless readers 112 may receive and store detection event data and then forward such data to server 103 and/or 1202 periodically. In some configurations, wireless readers 112 will transmit detection event data to server 103 and/or 1202 in real time or near real time. In some implementations, a local server associated with one or more of the various coverage zones will receive detection event data from one or more of the wireless readers 112 associated with the coverage zones. The local server may store detection event data and transmit such data to server 103 and/or 1202 for further processing.

In certain implementations, the size of various coverage zones can be adjusted based on adjusting the transmitter power of one or more wireless readers 112. The size of various coverage zones may be adjusted by configuring receiver sensitivity, adjusting receiver antenna configuration, or by orienting a receiver and/or transmitter of a wireless reader to increase or decrease a coverage zone. Where a wireless reader 112 operates in a passive scanning mode (i.e., scanning a reverse channel—transmission channel from a wireless device to a network station), the range of the wireless reader 112 may be limited by the output power of the wireless devices within its vicinity. For example, a mobile network will control the power output of mobile handsets in the vicinity of a mobile base station to reduce overall noise and improve system performance. Hence, a passive wireless reader of a mobile telephone network will have a limited range of intercept coverage. But, the range or zone of coverage may be further limited by physically configuring and/or orienting the wireless reader, and/or by reducing the receiver sensitivity. Hence, it may be less complex to reduce the coverage range of passive wireless readers as opposed to increasing the coverage range of passive wireless readers. Regardless, in some implementations, the coverage zone of various wireless readers associated with different wireless protocols are adjusted (increased or decreased) to enable sufficient overlap of the various coverage zones. In this way, the ability to detect multiple WD IDs associated with a particular user A is enhanced.

In certain implementations, one or more wireless readers 112 having overlapping coverage areas include one or more WNEs and/or DPEs. For example, at point B, user A is positioned within coverage zone 1102 (wireless telephone network reader), coverage zone 1104 (Wifi network reader), coverage zone 1108 (Bluetooth protocol reader), and coverage zone 1122 (RFID reader). A detection event when user A is at point B would enable system 100 and/or 300 to detect WD IDs associated with a mobile network, Wifi network, Blutetooth network, and RFID in a minimal period p1. But, because the coverage zone 1102, coverage zones 1104, and coverage zone 1108 extend beyond coverage zone 1122, the system 100 and/or 300 will detect many other WD IDs not related to user A, requiring handling and processing of much more detection data. In one implementation, the size of one or more coverage zones 1102, 1104, 1108, and 1122 is adjusted (increased or decreased) to increase the overlap among the various coverage zones 1102, 1104, 1108, and 1122. For example, a base station emulator (BSE) for coverage zone 1102 may be configured such that its transmitter power output establishes a coverage area approximately equal to coverage zone 1104. A WNE for coverage zone 1104 may be configured to establish a consistent and/or substantially overlapping coverage area with coverage zone 1102. In some configurations, at least two coverage zones, each being associated with a different wireless interface technology, are arranged to have substantially overlapping coverage zones, by adjusting a transmitter and/or receiver power output (and/or a physical configuration of a transmitter or receiver) of one or both of their respective wireless readers. In a similar manner, the coverage range of coverage zones 1108 and 1122 may be adjusted such that one or both of these coverage zones substantially overlap with coverage zone 1102 and/or 1104. In an optimal scenario where all coverage zones 1102, 1104, 1108, and 1122 substantially overlap, the detection period p1 may be configured to be shorter and the amount of detection data for a particular detection event is expected to be reduced. Such an implementation may be achieved using wireless reader 500 of FIG. 5A in which multiple wireless readers, each associated with a different wireless protocol interface, are implemented in the same wireless reader.

The range or area of coverage of a zone, e.g., coverage zone 1102, may be arranged to be less than about 3 meters in diameter to over several hundreds of meters in diameter (assuming a substantially circular area of coverage). Regardless of the coverage area shape, the area coverage may be less than or equal to about 1 $m^2$, 10 $m^2$, 100 $m^2$, 1000 $m^2$, 10000 $m^2$, 100000 $m^2$, and 1000000 $m^2$. For example, one or more of coverage zones 1102, 1104, 1108, and 1122 may be configured to substantially overlap while covering the platform area of a train station. In this instance, one or more of the coverage zones 1102, 1104, 1108, and 1122 may cover an area of about 10000 $m^2$. In this way, system 100 and/or 300 is configured to maximize reading and/or detection of WD IDs associated with as many users as possible passing through the train station. In another example, one or more coverage zones 1102, 1104, 1108, and 1122 may be configured to substantially overlap while covering the area around a cashier, a concession stand, and/or check-out counter. In this instance, one or more of the coverage zones 1102, 1104, 1108, and 1122 may cover an area of about 10 $m^2$. In this way, system 100 and/or 300 is configured to limit reading and/or detection of WD IDs to only those users and/or consumers using the cashier. The limited range for cashier or concession stand may allow system 100 and/or 300 to identify the number of times a consumer visits the concession stand. If the concession stand is for Miller beer, the system 100 and/or 300 may be able to determine the frequency and number of times certain users presumably purchase Miller beer.

Limited range detection locations (where coverage zones have coverage areas of, for example, 100 $m^2$ or less), may be located throughout a venue to track and/or analyze movements of users. For instance, an amusement park may implement detection locations (within limited coverage areas) at each of its main rides and attractions. In this way, the venue provider can determine which rides or attractions were most frequently visited (even if consumers did not make purchases at those rides or attractions). Thus, in certain configurations, the range or area of coverage zones may be increased to detect many WD IDs associated with many users, while in other circumstances, the range or area coverage zones may be minimized to more precisely detect a user's location and/or to limit the number of WD IDs detected during a detection event. In some implementations, the range or area of one or more coverage zone is limited by a physical structure (building, airplane shell, tunnel, and so on) to a room, airplane cabin, or tunnel, and so on. In one implementation, an entry area, turn style, room, or user space may be electromagnetically shielded to limit one or more coverage area to the shielded space. Access to and/or from the shielded space may be controlled or limited to one or more users at a time during which time a detection event may be initiated to detect WD IDs in the possession of the one or more users within the shielded space.

As previously discussed, system 100 and/or 300 (via, for example, server 103 and/or 1202) may schedule detection events at one or more wireless readers 112. The system 100 and/or 300 may set a detection time t1 and a detection period p1 for a detection event. The system 100 and/or 300 may configure the frequency of detection events at particular locations depending on time of day (rush hours), time of year (Christmas season), expected events (Super Bowl), and so on.

In some implementations, one or more wireless readers 112 are configured to initiate a detection event in response to an action or trigger event. For example, where a detection location (including one or more wireless readers 112) is positioned at a cashier of a retail store, system 100 and/or 300 may monitor a financial processing network (and/or cashier machine) to detect that a credit card authorization has been initiated by the cashier. In response to detecting the credit card transaction, system 100 and/or 300 instructs one or more wireless readers, e.g., wireless reader 500 at the cashier location, to initiate a detection event to detect one or more WD IDs at the location. Other types of actions may trigger a detection event such as, without limitation: physical detection of a user at a location (via optical, visual, motion, and/or acoustic sensor), initiating a call via mobile handset, detecting a particular location of a wireless reader (e.g, a mobile handset with wireless reader), manual initiation by a cashier or other person at a detection location, use of an ATM, opening/closing a door to a building or vehicle, using a badge for access or authorization to a system, facility, or service, passing through a tool booth or station, making a purchase from a vending machine, accessing an Internet service, accessing a website, playing an electronic game, encountering an event within an electronic game, and so on. In the case of a mobile wireless reader, the wireless reader may utilize the location functionality described with respect to FIG. 1 to determine its location and, then determine whether to initiate a detection event. Alternatively, the wireless reader may send its location information to server 103 and/or 1202, who will determine whether the wireless reader should initiate a detection event, and send a detection event initiation instruction to the wireless reader, optionally including parameters such as detection period.

In some implementations, one or more wireless readers 112 operate without control by the server 103 and/or 1202. Instead, one or more wireless readers 112 detect and store detection event data. The detection event data may be stored for minutes, hours, days, or years. If server 103 and/or 1202 desires detection event data from one or more wireless readers in a particular location, region, venue, and/or area, the server 103 and/or 1202 may query the one or more wireless readers 112 for detection event data during a particular date and/or time period. The one or more wireless readers 112 may negotiate with server 103 and/or 1202 on conditions for sending requested detection event data to server 103 and/or 1202. Different sets of wireless readers 112 may be located in the same location, region, venue, and/or area. Each set may be associated with or controlled by a different vendor, i.e., different WD ID farms. Hence, different wireless reader vendors may compete with each other to provide detection event data to server 103 and/or 1202. Different marketers, businesses, or other entities, each running its own server 103 and/or 1202, may bid for detection event data from various WD ID farms at various locations, regions, venues, and/or areas.

Figure 12:
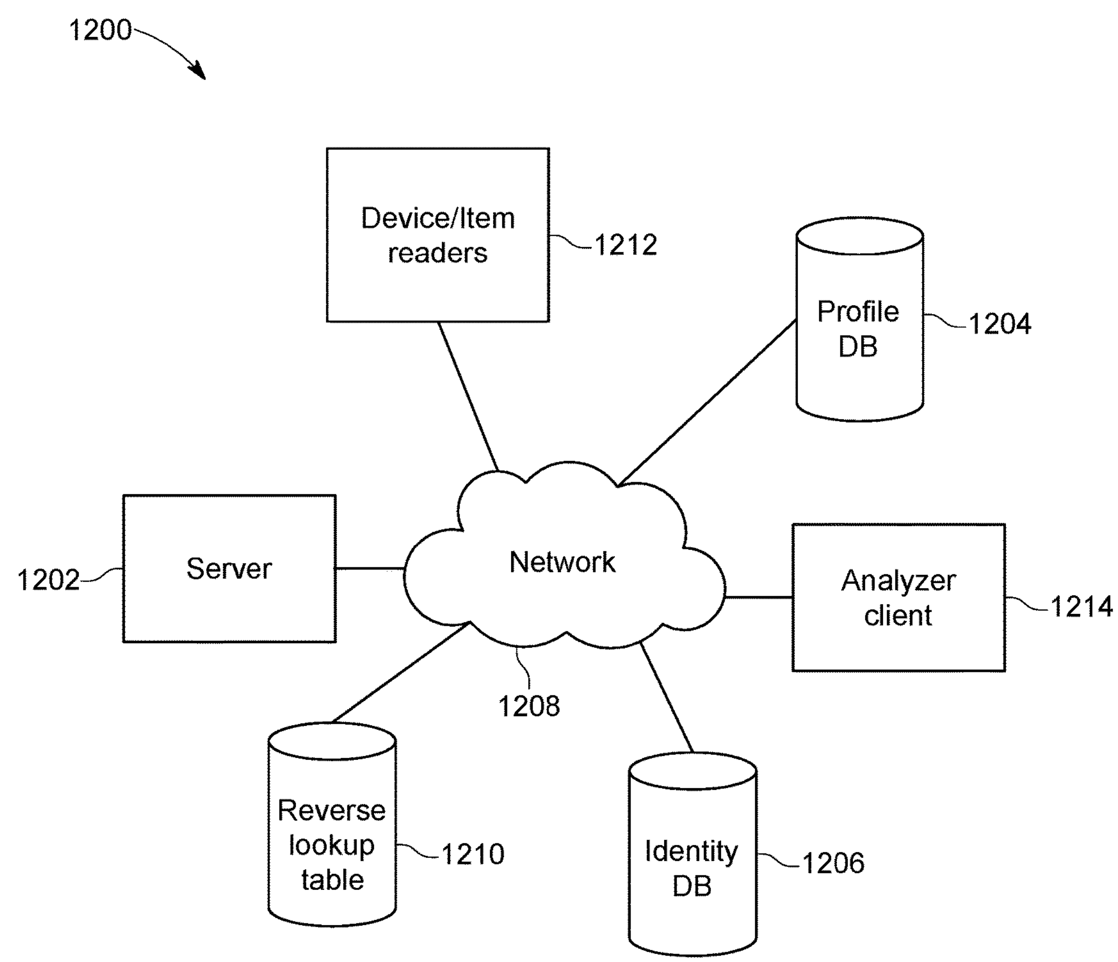
FIG. 12 illustrates a tracking system including a server with access to an identity database and a profile database.

FIG. 12 illustrates a consumer tracking system 1200 including a server 1202 with access to an identity database 1206, a profile database 1204, reverse lookup database 1210, and device/item readers 1212. The server 1202 may include functionality described with respect to server 103 of FIG. 1 and a computer system according to FIG. 2. The server 1202 may communication with and/or exchange data with an identity database 1206, profile database 1204, a reverse lookup database 1210, and/or any other data source connected with network 1208. Network 1208 may include the Internet, a private data network, or any other combination of interconnected data networks. In certain implementations, identity database includes detection event data received from wireless and/or device/item readers 1212. The device/Items readers 1212 may include one or more wireless readers 112 as described with respect to FIGS. 1 and 8.

In some implementations, server 1202 receives a first set of detected wireless device identifiers WD IDs from a first wireless reader 112 of readers 1212 and the second set of detected wireless device identifiers WD IDs from a second wireless reader 112 of readers 1212. The server 1202 compares the first set of wireless device identifiers with the second set of wireless device identifiers. The server 1202 identifies a first matching set of wireless device identifiers including matching wireless device identifiers between the first set of wireless device identifiers and the second set of wireless device identifiers. The server 1202 then associates a first user identity (e.g., user A) with the first matching set of wireless device identifiers. Depending on the type of detected WD IDs, the server 1202 may access a lookup table database 1210 to obtain additional identifier information associated with a user. For example, if one of the matching set of wireless device identifiers includes a MSID, the server 1202 may access lookup table database 1210 to access a reserve MSID lookup table (i.e., a reverse phone book) to obtain, for example, user A's actual name and address information. Server 1202 may store additional data gathered via a search of lookup table database 1210 in identity database 1206 along with detection event data including within one or more association tables 704 and 710.

Server 1202 may include multiple servers, i.e., a server farm, depending on the scale of the system 1200 and the number users being tracked. System 1200 may be used by a school to track students, in which case the scale of such as system may be relatively modest. System 1200 may be used to track thousands or millions of users nationally or globally, in which case the scale of such a system 1200 would be extensive, possibly requiring thousands of servers and database resources.

System 1202 may store detection event data collected from many wireless readers 1212 in many locations over a period of time in database 1206. Server 1202 may perform real time or near real time processing of detection event data. Server 1202 may enable post-processing and data mining of detection event data by one or more analyzer clients 1214. In some implementations, system 1202 may function in a similar manner as typical data Registry by collecting a large data set and allowing researchers, marketer, law enforcement, service providers, retail providers, and so on to access to the detection event data for subsequent analysis. Law enforcement may analyze detection event data via post-processing to determine the movement of a particular person over a period of time. Law enforcement could also use system 1202 to track a user in real time or near real time. A marketing company may analyze detection event data to identify users of a particular demographic with interest in certain activities or products. A city government may analyze detection event data to determine traffic patterns into or out of a city on a daily basis, and use such information for strategic development. The potential advantages to gathering and analyzing such data is limitless.

Fraud Prevention—

Once a set of wireless devices and/or wireless device identities are associated with a user, a check-out counter, Kiosk, ATM, cashier, or the like may check whether some or all of the wireless devices are present when a user attempts to make a purchase with a credit card associated with the user and/or set of wireless devices. If none of the wireless devices are present or only a portion of wireless devices are present, the purchase could be refused or the Kiosk/ATM/clerk could be alerted to request additional authentication information from the user to complete the purchase. In some implementations, the local device and/or wireless reader, e.g., cashier, sends a query to server 103 and/or 1202 including detected identities. The server 103 and/or 1202 performs the comparison of detected identities with the known identities associated with the credit card. The server transmits an approval or disapproval message back to the local cashier, to a credit processing system, or bank system. The server 103 and/or 1202 may notify a credit and/or financial processing system of its comparison results and the credit processing system may make a determination of whether to approve or disapprove the transaction, and send approval/disapproval to the local transaction terminal.

Law Enforcement Tracking—

In certain circumstances, system 100 and/or 300 may enable law enforcement to track a wireless device where the wireless device has masked its identity or is using a temporary identifier. For example, a GSM handset is typically assigned a TMSI by a mobile network to enable the mobile device to request services (i.e., make a phone call). The TMSI can be updated by a service provider at various times. The TMSI is derived in part from the IMSI stored in a SIM chip within the GSM handset. One purpose of the TMSI is to provide subscriber privacy by preventing an eavesdropper on the GSM network from tracking a GSM subscriber. One problem with using the TMSI is that law enforcement cannot track a GSM subscriber unless they have access to the GSM network infrastructure. One advantage of system 100 and/or 300 is that the identity of a subscriber can be determined regardless of when or how often the TMSI is changed by a GSM network. This is possible because the system 100 and/or 300 can associate multiple identifiers with a user (i.e., GSM subscriber). Thus, if user A has a GSM handset with a TMSI (i.e., WD IDa), an 802.11 capable iPad with a MAC address (i.e., WD IDb), and a purse with an RFID (i.e., WD IDc), even if the TMSI associated with the GSM handset is changed, the system 100 and/or 300 will detect WD IDb and WD IDc with the new TMSI (WD IDd). In a law enforcement tracking scenario, system 100 and/or 300, via server 103 and/or 1202, may update the association table, e.g., table 710, with WD IDd along with WD IDb and WD IDc. Furthermore, server 103 and/or 1202 will recognize that WD IDa was a TMSI based at least on how it was detected and its format. The system 100 and/or 300 may be configured to expect that WD IDa may have a relatively shorter life while expecting that a different TMSI may be detected along with WD IDb and WD IDc at some later detection event. To increase its assurance that the new TMSI (WD IDd) belongs to a particular user, e.g., user A, system 100 and/or 300, via server 103 and/or 1202, may instruct a wireless reader 112 via a message to transition to a WNE mode and illicit an IMSI (i.e, WD IDe) from user A's GSM handset. As IMSI is a more permanent subscriber identifier associated with user A, table 710, will likely have recorded it, which can then be compared with the recently detected IMSI. In some circumstances, law enforcement will know the MSID or IMSI of the target user, which may be input into table 710 by an operator of server 103 and/or 1202. Hence, system 100 and/or 300 advantageously enables detection and/or identification of consumers by tracking multiple identifiers associated with a consumer, regardless of whether certain identifiers may be changed or obscured at times.

It will be apparent to those of ordinary skill in the art that certain aspects involved in the operation of the server 103, server 1202, wireless devices, and/or wireless readers may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A system for associating a person with one or more wireless devices comprising:

- a first wireless reader arranged to detect a first set of wireless device identifiers at a first time and at a first location;
- a second wireless reader arranged to detect a second set of wireless device identifiers at a second time and at a second location; and
- a server, in electronic communication with the first and second wireless readers via a network, arranged to:
  - receive the first set of detected wireless device identifiers from the first wireless reader and the second set of detected wireless device identifiers from the second wireless reader;
  - compare the first set of wireless device identifiers with the second set of wireless device identifiers;
  - identify a first matching set of wireless device identifiers including matching wireless device identifiers between the first set of wireless device identifiers and the second set of wireless device identifiers; and
  - associate a first user identity with the first matching set of wireless device identifiers.

2. The system of claim 1, comprising a plurality of wireless readers dispersed over a plurality of known locations, wherein the server is further arranged to track the location of the first user based on detecting at least one wireless device identifier of the first matching set of wireless device identifiers at one of the plurality of known locations.

3. The system of claim 2, wherein tracking the location of the first user includes:

- comparing each of the received plurality of wireless device identifiers with at least one wireless device identifier of the first matching set of wireless device identifiers, and
- determining a location of the first user based on identifying a match between one of the received plurality of wireless device identifiers and the at least one wireless device identifier of the first matching set of wireless device identifiers.

4. The system of claim 1, wherein a location includes an area of wireless coverage of a wireless reader.

5. The system of claim 4, wherein a wireless reader includes at least one of an RFID reader, a base station, an access point, a base station emulator, and an access point emulator, a wireless network emulator, a data network emulator, a data service emulator, a website emulator, a wireless network scanner, and an access point scanner.

6. The system of claim 1, wherein the first wireless reader and the second wireless reader are the same and the first location and the second location are the same.

7. The system of claim 1, wherein detecting identifiers at the first and second times is performed for the duration of a time period, wherein the time period is less than or equal to one of 1 second, 10 seconds, 30 seconds, 1 minute, 10 minutes, 30 minutes, 1 hour, 8 hours, 1 day, 1 month, and 1 year.

8. The system of claim 1, wherein the second time occurs after the first time.

9. The system of claim 1, wherein the first wireless reader includes a wireless interface implementing a first wireless protocol and the second wireless reader includes a wireless interface implementing a second wireless protocol different from the first wireless protocol.

10. The system of claim 9, wherein the first and second wireless protocols include one of mobile telephone standard, an 802.11 standard, a Wifi-based standard, a Bluetooth standard, and an RFID standard.

11. The system of claim 1 comprising a third wireless reader arranged to detect a third set of wireless device identifiers at a third time and at a third location, the server further arranged to:

compare the third set of wireless device identifiers with the first matching set of wireless device identifiers;

identify a second matching set of wireless device identifiers including matching wireless device identifiers between the third set of wireless device identifiers and the first matching set of wireless device identifiers; and associate the first user identity with the second matching set of wireless device identifiers.

12. The system of claim 11, wherein the third time occurs after the first and second time periods.

13. The system of claim 12, comprising a plurality of wireless readers dispersed over a plurality of locations, wherein the server is further arranged to track the location of the first user based on detecting at least one wireless device identifier of the second matching set of wireless device identifiers.

14. The system of claim 1, wherein the one or more wireless devices include at least one of a handheld computer, a personal digital assistant, a cellular or mobile telephone, a network appliance, a camera, a smart phone, a media player, a navigation device, an email device, a game console, or a combination of any two or more of these data processing devices, or a data processing device including a wireless communications interface.

15. The system of claim 1, wherein the server is further arranged to determine a type of wireless device identifier of one or more of the wireless identifiers of the first and second set of wireless identifiers.

16. The system of claim 15, wherein determining the type of wireless device identifier is based on one or more of a size of a wireless device identifier, a format of a wireless device identifier, a message containing a wireless device identifier, a wireless protocol containing a wireless device identifier, a data protocol containing a wireless device identifier, and the type of message containing a wireless device identifier.

17. The system of claim 16, wherein the server assigns a weight to a wireless device identifier based on the type of wireless device identifier.

18. A server for associating a person with one or more wireless devices comprising:

a communications interface configured to:

receive, from a first wireless reader, a first set of wireless device identifiers detected at a first time and at a first location;

receive, from a second wireless reader, a second set of wireless device identifiers detected at a second time and at a second location; and a processor configured to:

compare the first set of wireless device identifiers with the second set of wireless device identifiers;

identify a first matching set of wireless device identifiers including matching wireless device identifiers between the first set of wireless device identifiers and the second set of wireless device identifiers; and associate a first user identity with the first matching set of wireless device identifiers.

19. The server of claim 18 comprising a memory for storing location information associated with each of a plurality of wireless readers dispersed over a plurality of locations;

wherein the communications interface is configured to receive a plurality of wireless device identifiers from the plurality of wireless readers, and wherein the processor is configured to:

compare each of the received plurality of wireless device identifiers with at least one wireless device identifier of the first matching set of wireless device identifiers, and determine a location of the first user based on identifying a match between one of the received plurality of wireless device identifiers and the at least one wireless device identifier of the first matching set of wireless device identifiers.

20. A non-transient computer readable medium containing program instructions for causing a computer to perform the method of:

receiving, from a first wireless reader, a first set of wireless device identifiers detected at a first time and at a first location;

receiving, from a second wireless reader, a second set of wireless device identifiers detected at a second time and at a second location;

comparing the first set of wireless device identifiers with the second set of wireless device identifiers;

identifying a first matching set of wireless device identifiers by matching wireless device identifiers between the first set of wireless device identifiers and the second set of wireless device identifiers; and associating a first user identity with the first matching set of wireless device identifiers.

* * * * *